United States Patent
Mori et al.

(10) Patent No.: US 12,489,619 B2
(45) Date of Patent: Dec. 2, 2025

(54) TERMINAL APPARATUS, ENCRYPTED INFORMATION TRANSFORMATION APPARATUS, COLLATION SYSTEM, INPUT INFORMATION ENCRYPTION METHOD, ENCRYPTED INFORMATION TRANSFORMATION METHOD, COLLATION METHOD, INPUT INFORMATION ENCRYPTION PROGRAM, AND ENCRYPTED INFORMATION TRANSFORMATION PROGRAM

(71) Applicant: NEC Corporation, Tokyo (JP)

(72) Inventors: Kengo Mori, Tokyo (JP); Toshiyuki Isshiki, Tokyo (JP); Sanami Nakagawa, Tokyo (JP); Hiroto Tamiya, Tokyo (JP); Masahiro Nara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 174 days.

(21) Appl. No.: 18/570,734

(22) PCT Filed: Jun. 25, 2021

(86) PCT No.: PCT/JP2021/024182
§ 371 (c)(1),
(2) Date: Dec. 15, 2023

(87) PCT Pub. No.: WO2022/269914
PCT Pub. Date: Dec. 29, 2022

(65) Prior Publication Data
US 2024/0291646 A1   Aug. 29, 2024

(51) Int. Cl.
*H04L 9/08*   (2006.01)

(52) U.S. Cl.
CPC .......... *H04L 9/0869* (2013.01); *H04L 9/0894* (2013.01)

(58) Field of Classification Search
CPC ...... H04L 9/0869; H04L 9/0894; G06F 21/32
(Continued)

(56) References Cited

U.S. PATENT DOCUMENTS 6,711,400 B1 *   3/2004   Aura ................... H04W 12/069
                                                    455/433
6,845,159 B1 *   1/2005   Domstedt ............. H04L 9/0618
                                                    713/193

(Continued)

FOREIGN PATENT DOCUMENTS

JP   2006-121215 A   5/2006
JP   2008-046151 A   2/2008

(Continued)

OTHER PUBLICATIONS

Written opinion for PCT Application No. PCT/JP2021/024182, mailed on Aug. 24, 2021 with English translation.

(Continued)

*Primary Examiner* — Samson B Lemma
(74) *Attorney, Agent, or Firm* — Sughrue Mion, PLLC

(57) ABSTRACT

In order to realize encryption processing capable of suppressing the degradation of collation accuracy and reducing the risk of information leakage, a terminal apparatus for encrypting input information to be input for collation is provided, the terminal apparatus being configured to perform transformation parameter generation processing for generating a transformation parameter based on a first parameter stored in a storage area and a second parameter that is different from the first parameter, and encrypt the input information input for collation using the transformation parameter to generate encrypted input information.

10 Claims, 24 Drawing Sheets

(58) Field of Classification Search
USPC .......................................................... 380/44
See application file for complete search history.

(56) References Cited

U.S. PATENT DOCUMENTS

| | | | | |
|---|---|---|---|---|
| 10,262,161 | B1* | 4/2019 | Mcclintock | G06F 21/52 |
| 2001/0031050 | A1* | 10/2001 | Domstedt | H04L 9/065 |
| | | | | 380/44 |
| 2009/0106561 | A1* | 4/2009 | Ejiri | G06F 21/62 |
| | | | | 713/193 |
| 2012/0005736 | A1 | 1/2012 | Takahashi et al. | |
| 2012/0159194 | A1* | 6/2012 | Anderson | G06F 21/14 |
| | | | | 713/190 |
| 2016/0204936 | A1 | 7/2016 | Sakemi et al. | |
| 2018/0304857 | A1* | 10/2018 | Peeters | H04L 9/14 |
| 2019/0394022 | A1* | 12/2019 | Kaman | H04L 9/0631 |
| 2019/0394171 | A1* | 12/2019 | Kaman | H04L 9/0662 |
| 2020/0099510 | A1* | 3/2020 | Mao | H04L 9/14 |
| 2022/0029791 | A1* | 1/2022 | Black | H04L 9/0861 |

FOREIGN PATENT DOCUMENTS

| | | |
|---|---|---|
| JP | 2010-186075 A | 8/2010 |
| JP | 2011-248778 A | 12/2011 |
| JP | 2016-131335 A | 7/2016 |
| WO | 2010/070787 A1 | 6/2010 |

OTHER PUBLICATIONS

International Search Report for PCT Application No. PCT/JP2021/024182, mailed on Aug. 24, 2021.

N.K.Ratha,et al., "Enhancing security and privacy in biometrics-based authentication systems", IBM Systems Journal 40(3), pp. 614-634, 2001.

* cited by examiner

Fig. 10

| No. | VERSION INFORMATION | ENCRYPTED DATA | IDENTIFICATION INFORMATION | |
|---|---|---|---|---|
| 1 | v1 | ENCRYPTED DATA $T$ | EwFsih | ... |
| 2 | v2 | ENCRYPTED DATA $TR$ | u1WLMo | ... |
| ... | ... | ... | ... | ... |

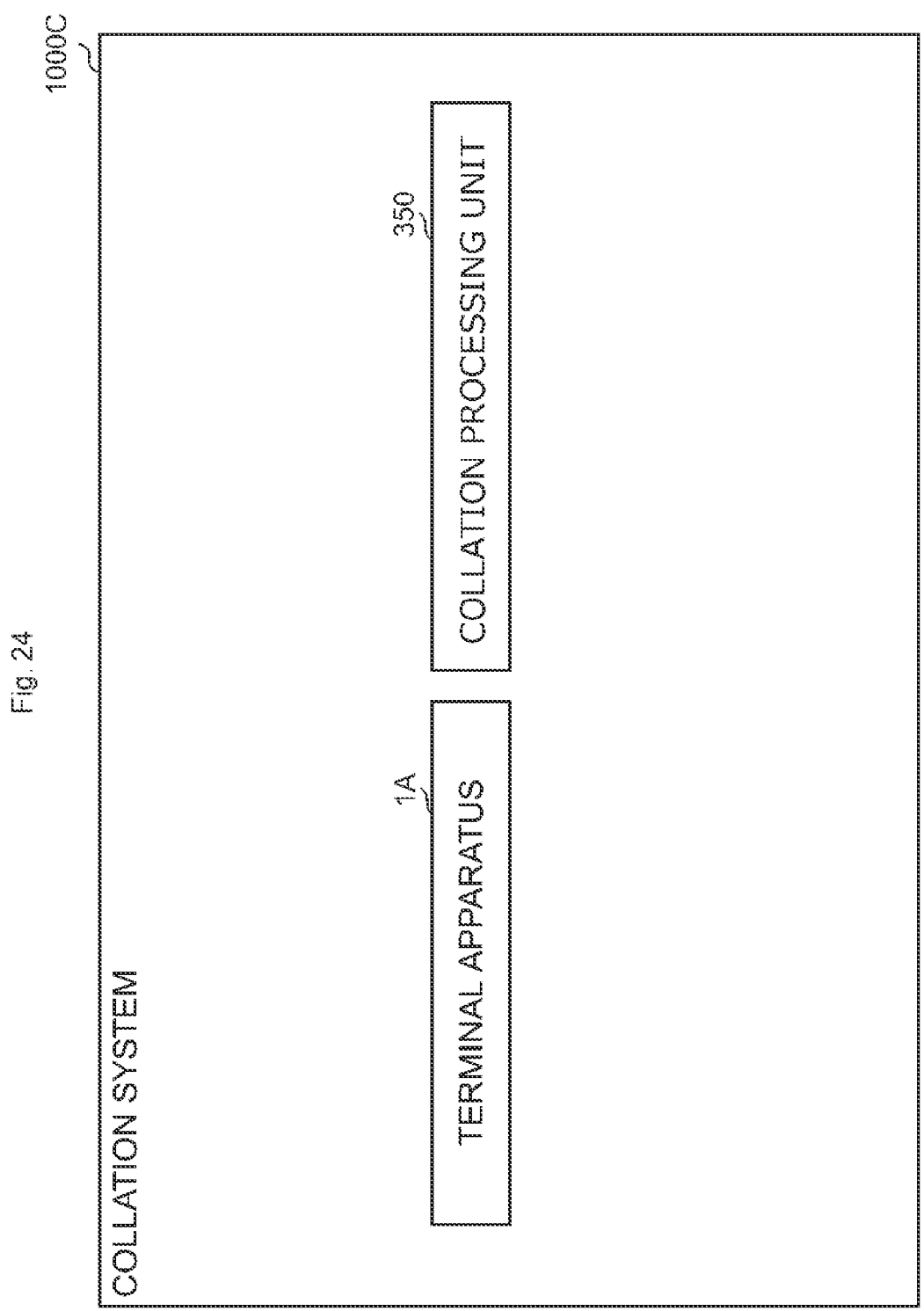

TERMINAL APPARATUS, ENCRYPTED INFORMATION TRANSFORMATION APPARATUS, COLLATION SYSTEM, INPUT INFORMATION ENCRYPTION METHOD, ENCRYPTED INFORMATION TRANSFORMATION METHOD, COLLATION METHOD, INPUT INFORMATION ENCRYPTION PROGRAM, AND ENCRYPTED INFORMATION TRANSFORMATION PROGRAM

This application is a National Stage Entry of PCT/JP2021/024182 filed on Jun. 25, 2021, the contents of all of which are incorporated herein by reference, in their entirety.

TECHNICAL FIELD

The present invention relates to a terminal apparatus, an encrypted information transformation apparatus, a collation system, an input information encryption method, an encrypted information transformation method, a collation method, an input information encryption program, and an encrypted information transformation program.

BACKGROUND ART

In recent years, a biometric authentication technology, which performs authentication by collating biometric information such as fingerprints, veins, irises, and facial images, is widely used as one of user authentication schemes. In such a biometric authentication technology, features are extracted from biometric information on users and stored as registration information. The authentication is determined by performing collation between features of biometric information input from a user for authentication and the registration information.

The biometric authentication technology has the advantage of being less vulnerable to loss and theft than authentication technologies using IC cards, etc. On the other hand, biometric information cannot be discarded or updated even in the case in which the biometric information is compromised. In other words, the leakage of biometric information leads to not only a problem related to personal information on a living body of which the biometric information is compromised, but also a problem impairing the security of an authentication system that uses the compromised biometric information on the living body.

For solving the above problems, a technology called "cancelable biometrics", which enables invalidation of registration information, has been proposed to protect biometric information on users.

In the cancelable biometrics, elements in features extracted from biometric information are permutated using a secret key to encrypt them, thereby generating registration information. In addition, elements in features extracted from biometric information input at the time of authentication are encrypted using the same secret key used at the time of registration to generate collation information. In other words, when regenerating the registration information, the use of a different secret key allows to invalidate the registration information that has been already generated. Encryption in the cancelable biometrics is referred to as "cancelable transformation" because of such characteristics of the registration information. For example, NPL 1 proposes, as the cancelable transformation, a method for generating registration information and collation information by dividing an image including feature points obtained from fingerprints, etc. into blocks, and then permutating the order of the divided blocks using a secret key.

CITATION LIST

Non Patent Literature

[NPL 1] N. K. Ratha, et al., "Enhancing security and privacy in biometrics-based authentication systems", IBM Systems Journal 40(3), 614-634, 2001.

SUMMARY

Technical Problem

In the above-mentioned related cancelable transformation, the same secret key is used at both the time of registration and the time of collation to transform the elements in the features extracted from the biometric information. Therefore, in order to reduce the risk of leakage of biometric information, it is desirable to collate the collation information with the registration information in a state in which the cancelable transformation has been performed. It is also desirable to perform the cancelable transformation such that the accuracy for collation is as good as that of the above-mentioned related biometric authentication technology when collating the collation information with the registration information.

In light of the problem described above, an example object of the present invention is to provide a terminal apparatus, an encrypted information transformation apparatus, a collation system, an input information encryption method, an encrypted information transformation method, a collation method, an input information encryption program, and an encrypted information transformation program that perform encryption processing capable of suppressing the degradation of collation accuracy and reducing the risk of information leakage.

Solution to Problem

A terminal apparatus according to the present invention is an apparatus for encrypting input information to be input for collation. The terminal apparatus includes a terminal-side storage area configured to store a first parameter, a terminal-side acquisition unit configured to acquire a second parameter, a transformation parameter generation unit configured to perform transformation parameter generation processing for generating a transformation parameter based on the first parameter and the second parameter, and an encrypted information generation unit configured to encrypt the input information using the transformation parameter to generate encrypted input information.

An encrypted information transformation apparatus according to the present invention is an apparatus for transforming encrypted input information into updated encrypted input information, the encrypted input information being generated by encrypting input information to be input for collation using a transformation parameter, and the transformation parameter being generated based on a first parameter and a second parameter. The encrypted information transformation apparatus includes a transformation-side storage area configured to store the first parameter, a transformation-side acquisition unit configured to acquire the second parameter used for generating the encrypted input information, and a third parameter that is different from the second parameter, an encryption transformation parameter generation unit configured to, using the first parameter, the second parameter and the third parameter, generate an encryption transformation parameter for transforming the encrypted input information, and an updated information generation unit configured to transform the encrypted input information using the encryption transformation parameter to generate the updated encrypted input information.

An encrypted information transformation apparatus according to the present invention is an apparatus for transforming encrypted input information into updated encrypted input information, the encrypted input information being generated by encrypting input information to be input for collation using a transformation parameter, and the transformation parameter being generated using a first parameter and a second parameter. The encrypted information transformation apparatus includes a transformation-side storage area configured to store a plurality of master parameters including the first parameter, a transformation-side acquisition unit configured to acquire the second parameter used for generating the encrypted input information, an encryption transformation parameter generation unit configured to, using the plurality of master parameters and the second parameter, generate an encryption transformation parameter for transforming the encrypted input information, and an updated information generation unit configured to transform the encrypted input information using the encryption transformation parameter to generate the updated encrypted input information.

A collation system according to the present invention includes a terminal apparatus for encrypting input information to be input for collation, and a collation processing unit. The terminal apparatus includes a terminal-side storage area configured to store a first parameter, a terminal-side acquisition unit configured to acquire a second parameter, a transformation parameter generation unit configured to perform transformation parameter generation processing for generating a transformation parameter based on the first parameter and the second parameter, and an encrypted information generation unit configured to encrypt the input information using the transformation parameter to generate encrypted input information. The collation processing unit is configured to perform collation processing for performing collation between first input information, which is input to the terminal apparatus for collation, and second input information, which is different from the first input information input to the terminal apparatus for collation, based on first encrypted input information and second encrypted input information, the first encrypted input information being generated by encrypting the first input information using the transformation parameter by the encrypted information generation unit, and the second encrypted input information being generated by encrypting the second input information.

A collation system according to the present invention includes a terminal apparatus for encrypting input information to be input for collation, and a collation processing unit. The terminal apparatus includes a terminal-side storage area configured to store a first parameter, a terminal-side acquisition unit configured to acquire a second parameter, a transformation parameter generation unit configured to perform transformation parameter generation processing for generating a transformation parameter based on the first parameter and the second parameter, and an encrypted information generation unit configured to encrypt the input information using the transformation parameter to generate encrypted input information. The collation processing unit configured to perform collation processing for performing collation between third input information, which is input to the terminal apparatus for collation, and fourth input information, which is different from the third input information input to the terminal apparatus for collation, based on third encrypted input information and fourth encrypted input information, the third encrypted input information being generated by encrypting the third input information using the transformation parameter by the encrypted information generation unit, and the fourth encrypted input information being generated by encrypting the fourth input information.

An input information encryption method according to the present invention includes performing transformation parameter generation processing for generating a transformation parameter based on a first parameter stored in a storage area, and a second parameter that is different from the first parameter, and encrypting, using the transformation parameter, input information to be input for collation to generate encrypted input information.

An encrypted information transformation method according to the present invention is a method for transforming encrypted input information into updated encrypted input information, the encrypted input information being generated by encrypting input information to be input for collation using a transformation parameter, and the transformation parameter being generated using a first parameter and a second parameter. The encrypted information transformation method includes acquiring the second parameter used for generating the encrypted input information, acquiring a third parameter that is different from the second parameter, generating, using the first parameter stored in a storage area and the acquired second and third parameters, an encryption transformation parameter for transforming the encrypted input information, and transforming the encrypted input information using the encryption transformation parameter to generate the updated encrypted input information.

An encrypted information transformation method according to the present invention is a method for transforming encrypted input information into updated encrypted input information, the encrypted input information being generated by encrypting input information to be input for collation using a transformation parameter, and the transformation parameter being generated using a first parameter and a second parameter. The encrypted information transformation method includes acquiring the second parameter used for generating the encrypted input information, generating, using the second parameter and a master parameter other than the first parameter stored in a storage area, an encryption transformation parameter for transforming the encrypted input information, and the, and transforming the encrypted input information using the encryption transformation parameter to generate the updated encrypted input information.

A collation method according to the present invention includes performing transformation parameter generation processing for generating a transformation parameter based on a first parameter stored in a storage area in a terminal apparatus, and a second parameter that is different from the first parameter, encrypting input information to be input for collation using the transformation parameter to generate encrypted input information, and performing collation processing for performing collation between first input information for collation, and second input information, which is different from the first input information input for collation, based on first encrypted input information and second encrypted input information, the first encrypted input information being generated by encrypting the first input information using the transformation parameter, and the second encrypted input information being generated by encrypting the second input information.

A collation method according to the present invention includes performing transformation parameter generation processing for generating a transformation parameter based on a first parameter stored in a storage area in a terminal apparatus, and a second parameter that is different from the first parameter, encrypting input information to be input for collation using the transformation parameter to generate encrypted input information, and performing collation processing for performing collation between third input information, which is input for collation, and fourth input information, which is different from the third input information input for collation, based on third encrypted input information and fourth encrypted input information, the third encrypted input information being generated by encrypting the third input information using the transformation parameter, and the fourth encrypted input information being generated by encrypting the fourth input information.

An input information encryption program according to the present invention causes a processor to execute performing transformation parameter generation processing for generating a transformation parameter based on a first parameter stored in a storage area, and a second parameter that is different from the first parameter, and encrypting, using the transformation parameter, input information to be input for collation to generate encrypted input information.

An encrypted information transformation program according to the present invention is a program for transforming encrypted input information into updated encrypted input information, the encrypted input information being generated by encrypting input information to be input for collation using a transformation parameter, and the transformation parameter being generated using a first parameter and a second parameter. The encrypted information transformation program causes a processor to execute acquiring the second parameter used for generating the encrypted input information, acquiring a third parameter that is different from the second parameter, generating, using the first parameter stored in a storage area and the acquired second and third parameters, an encryption transformation parameter for transforming the encrypted input information, and transforming the encrypted input information using the encryption transformation parameter to generate the updated encrypted input information.

An encrypted information transformation program according to the present invention is a program for transforming encrypted input information into updated encrypted input information, the encrypted input information being generated by encrypting input information to be input for collation using a transformation parameter, and the transformation parameter being generated using a first parameter and a second parameter. The encrypted information transformation program causes a processor to execute acquiring the second parameter used for generating the encrypted input information, generating, using the second parameter and a master parameter other than the first parameter stored in a storage area, an encryption transformation parameter for transforming the encrypted input information, and transforming the encrypted input information using the encryption transformation parameter to generate the updated encrypted input information.

Advantageous Effects of Invention

The present invention provides the terminal apparatus, the encrypted information transformation apparatus, the collation system, the input information encryption method, the encrypted information transformation method, the collation method, the input information encryption program, and the encrypted information transformation program that perform encryption processing capable of suppressing the degradation of collation accuracy and reducing the risk of information leakage. Note that, according to the present invention, instead of or together with the above effects, other effects may be exerted.

BRIEF DESCRIPTION OF THE DRAWINGS

FIG. 10 is a diagram illustrating respective configuration examples of pieces of information stored in a database according to the first example embodiment;

FIG. 24 is a diagram illustrating a schematic configuration of a collation system according to the third example embodiment.

DESCRIPTION OF THE EXAMPLE EMBODIMENTS

Figure 1:
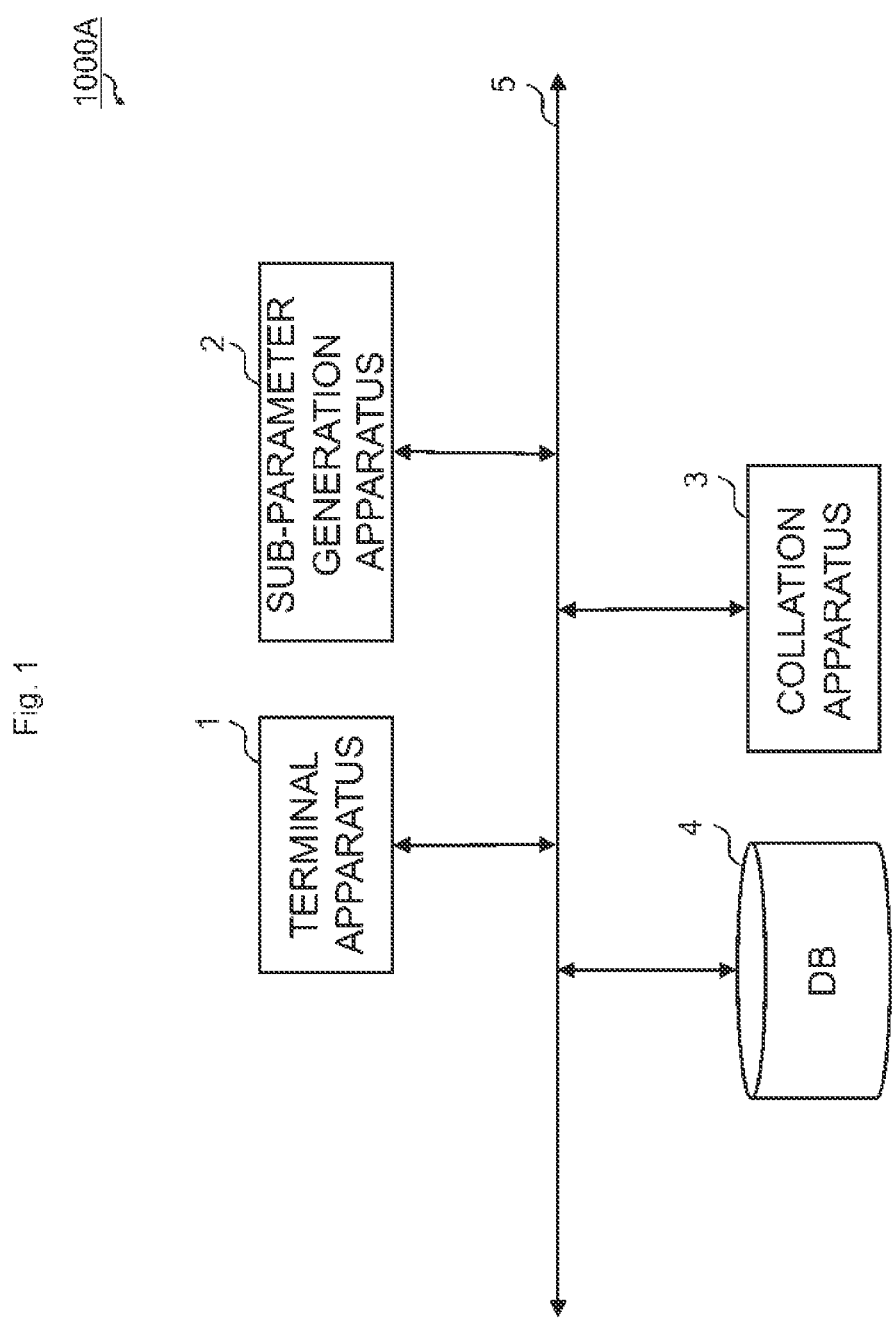
FIG. 1 is a diagram illustrating an example operation embodiment of a collation system according to a first example embodiment.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Each example embodiment described below is merely an example for configurations for enabling implementation of the present invention. Each example embodiment described below can be modified or changed as appropriate according to configurations and various conditions of an apparatus to which the present invention is applied. Not necessarily all of the combinations of elements included in each example embodiment described below are essential for implementation of the present invention, and a part of the elements can be omitted as appropriate. Thus, the scope of the present invention is not limited to the configurations described in each example embodiment described below. Configurations obtained by combining a plurality of configurations described in the example embodiments can also be adopted as far as there is no inconsistency.

Descriptions will be given in the following order.
1. Overview of Example Embodiments of Present Invention
2. First Example Embodiment
   2.1. Overview of Example Operation Embodiment of Collation System
   2.2. Hardware Configuration of Information Processing Apparatus
   2.3. Overview of Cancelable Biometrics
   2.4. Functional Configuration of Terminal Apparatus
   2.5. Functional Configuration of Sub-Parameter Generation Apparatus
   2.6. Functional Configuration of Collation Apparatus
   2.7. Flow of Processing of Encrypting Feature Data in Collation System
   2.8. Flow of Processing of Performing Collation in Collation System
      2.8.1. Example 1
      2.8.2. Example 2
      2.8.3. Summary of First Example Embodiment
3. Example Alternations of First Example Embodiment
   3.1. Example Alternation 1
   3.2. Example Alternation 2
   3.3. Example Alternation 3
4. Second Example Embodiment
5. Third Example Embodiment
6. Other Example Embodiments

1. Overview of Example Embodiments of Present Invention

First, an overview of example embodiments of the present invention will be described.

(1) Technical Issues

In recent years, a biometric authentication technology, which performs authentication by collating biometric information such as fingerprints, veins, irises, and facial images, is widely used as one of user authentication schemes. In such a biometric authentication technology, features are extracted from biometric information on users and stored as registration information. The authentication is determined by performing collation between features of biometric information input from a user for authentication and the registration information.

The biometric authentication technology has the advantage of being less vulnerable to loss and theft than authentication technologies using IC cards, etc. On the other hand, biometric information cannot be discarded or updated even in the case in which the biometric information is compromised. In other words, the leakage of biometric information leads to not only a problem related to personal information on a living body of which the biometric information is compromised, but also a problem impairing the security of an authentication system that uses the compromised biometric information on the living body.

For solving the above problems, a technology called "cancelable biometrics", which enables invalidation of registration information, has been proposed to protect biometric information on users.

In the cancelable biometrics, elements in features extracted from biometric information are permutated using a secret key to encrypt them, thereby generating registration information. In addition, elements in features extracted from biometric information input at the time of authentication are encrypted using the same secret key used at the time of registration to generate collation information. In other words, when regenerating the registration information, the use of a different secret key allows to invalidate the registration information which has been already generated. Encryption in the cancelable biometrics is referred to as "cancelable transformation" because of such characteristics of the registration information. For example, there has been proposed, as the cancelable transformation, a method for generating registration information and collation information by dividing an image including feature points obtained from fingerprints, etc. into blocks, and then permutating the order of the divided blocks using a secret key.

As mentioned above, in the cancelable transformation, the same secret key is used at both the time of registration and the time of collation to transform the elements in the features extracted from the biometric information. Therefore, in order to reduce the risk of leakage of biometric information, it is desirable to collate the collation information with the registration information in a state in which the cancelable transformation has been performed. It is also desirable to perform the cancelable transformation such that the accuracy for collation is as good as that of the above-mentioned related biometric authentication technology when collating the collation information with the registration information.

In light of the problem described above, example embodiments below provide a terminal apparatus, an encrypted information transformation apparatus, a collation system, an input information encryption method, an encrypted information transformation method, a collation method, an input information encryption program, and an encrypted information transformation program that perform encryption processing capable of suppressing the degradation of collation accuracy and reducing the risk of information leakage.

(2) Technical Features

In example embodiments of the present invention, a terminal apparatus for encrypting input information to be input for collation is provided. The terminal apparatus includes a terminal-side storage area configured to store a first parameter, a terminal-side acquisition unit configured to acquire a second parameter, a transformation parameter generation unit configured to perform transformation parameter generation processing for generating a transformation parameter based on the first parameter and the second parameter, and an encrypted information generation unit configured to encrypt the input information using the transformation parameter to generate encrypted input information.

Further, in example embodiments of the present invention, there is provided an encrypted information transformation apparatus for transforming encrypted input information into updated encrypted input information, the encrypted input information being generated by encrypting input information to be input for collation using a transformation parameter, the transformation parameter being generated based on a first parameter and a second parameter. The encrypted information transformation apparatus includes a transformation-side storage area configured to store the first parameter, a transformation-side acquisition unit configured to acquire the second parameter used for generating the encrypted input information, and a third parameter that is different from the second parameter, an encryption transformation parameter generation unit configured to, using the first parameter, the second parameter and the third parameter, generate an encryption transformation parameter for transforming the encrypted input information, and an updated information generation unit configured to transform the encrypted input information using the encryption transformation parameter to generate the updated encrypted input information.

The above configurations can provide a terminal apparatus, an encrypted information transformation apparatus, a collation system, an input information encryption method, an encrypted information transformation method, a collation method, an input information encryption program, and an encrypted information transformation program that perform encryption processing capable of suppressing the degradation of collation accuracy and reducing the risk of information leakage. The technical features described above are specific example embodiments of the present invention, and naturally, example embodiments of the present invention are not limited to the technical features described above.

2. First Example Embodiment

In the following, with reference to FIGS. 1 to 15, a first example embodiment of the present invention will be described. In the present example embodiment, a collation system using biometric information on users such as fingerprints, veins, irises, facial images, and the like will be described.

2.1. Overview of Example Operation Embodiment of Collation System

FIG. 1 is a diagram illustrating an example operation embodiment of a collation system 1000A according to the first example embodiment of the present invention. As illustrated in FIG. 1, the collation system 1000A includes a terminal apparatus 1, a sub-parameter generation apparatus 2, a collation apparatus 3, and a Data Base (hereinafter sometimes referred to as "DB") 4, and these are connected via a network 5. Input information to be input to the collation system 1000A includes biometric information on users such as fingerprints, veins, irises, facial images, and the like. In addition, information including data that requires a high level of confidentiality and security is one example of the input information.

The terminal apparatus 1 is an information processing apparatus, such as a computer or server, on which a program for encrypting the input information input to the collation system 1000A is installed. The terminal apparatus 1 may be implemented, for example, by a portable information processing terminal such as a smartphone, an Automatic Teller Machine (ATM), or a Personal Computer (PC) connected to a sensor for detecting the biometric information. Details of processing of encrypting information in the terminal apparatus 1 will be described later. The input information encrypted by the terminal apparatus 1 (hereinafter referred to as "encrypted input information") is stored in the DB 4.

The sub-parameter generation apparatus 2 is an information processing apparatus on which a program for generating a sub-parameter is installed. The sub-parameter is a parameter for generating a transformation parameter to be used in encrypting the biometric information on a user. The sub-parameter generation apparatus 2 generates, for example, a second random number seed for generating a random number, an encryption parameter, etc., as sub-parameters. The sub-parameter generation apparatus 2 may generate sub-parameters based on a character string input to the sub-parameter generation apparatus 2 by a user. The sub-parameter generation apparatus 2 transmits the generated sub-parameters to the terminal apparatus 1 and the collation apparatus 3 via the network 5. The sub-parameter generation apparatus 2 is an example of a parameter transmission apparatus in the present example embodiment.

The collation apparatus 3 is an information processing apparatus on which a program for collating the input information for the collation system 1000A based on the encrypted information generated by the terminal apparatus 1 is installed. For example, in a biometric authentication technology, the collation apparatus 3 performs collation between features in biometric information on a user, which have been stored in the DB 4, and features in biometric information on a user, which is acquired from the terminal apparatus 1. In addition, the collation apparatus 3 generates an encryption transformation parameter based on the sub-parameter received from the sub-parameter generation apparatus 2, and transforms the encrypted input information, which has been stored in the DB 4, by using the generated encryption transformation parameter. In other words, the collation apparatus 3 is an example of an encrypted information transformation apparatus in the present example embodiment. The encrypted input information transformed by the collation apparatus 3 may be referred to as "updated encrypted input information", and may be stored in the DB 4. The collation system 1000A may authenticate a user based on a result of the collation processing performed by the collation apparatus 3.

The DB 4 is a storage medium that stores information, and stores, for example, the encrypted input information generated by the terminal apparatus 1, the updated encrypted input information generated by the collation apparatus 3, and the like. Although FIG. 1 illustrates the collation apparatus 3 and the DB 4 as separated elements, the DB 4 may be implemented in a storage medium such as a hard disk drive (HDD) included in the collation apparatus 3.

Although FIG. 1 illustrates an example in which the sub-parameter generation apparatus 2 is connected to the network 5, it does not need to be connected to the network 5. For example, the sub-parameter generation apparatus 2 may be connected to the terminal apparatus 1 and the collation apparatus 3 by using a Universal Serial Bus (USB) or the like. The terminal apparatus 1 may be connected to the DB 4 when transmitting the encrypted input information to the DB 4. Further, the collation apparatus 3 may be connected to the terminal apparatus 1 or the DB 4 when communicating with them.

Furthermore, the sub-parameter generation apparatus 2 may be connected to the terminal apparatus 1 or the collation apparatus 3 when transmitting the sub-parameter. The collation system 1000A may include another information processing apparatus including the same elements as those of the terminal apparatus 1.

2.2. Hardware Configuration of Information Processing Apparatus

Figure 2:
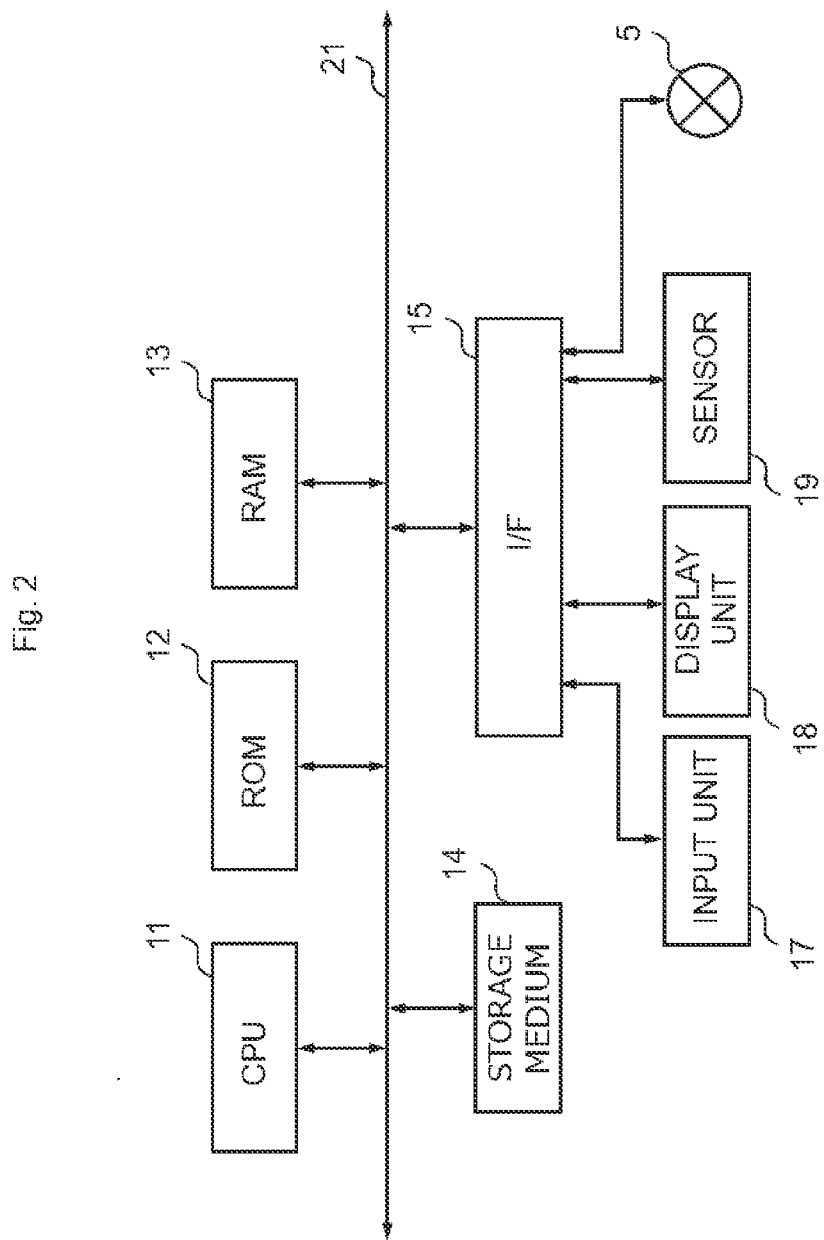
FIG. 2 is a block diagram illustrating an example of a hardware configuration of an information processing apparatus included in the collation system according to the first example embodiment.

Next, referring to FIG. 2, a hardware configuration of an information processing apparatus to be used for the terminal apparatus 1, the sub-parameter generation apparatus 2, and the collation apparatus 3 according to the present example embodiment will be described. FIG. 2 is a block diagram illustrating a hardware configuration of the information processing apparatus.

The information processing apparatus includes a Central Processing Unit (CPU) 11, a Read Only Memory (ROM) 12, a Random Access Memory (RAM) 13, a storage medium 14, and an interface (I/F) 15, and they are connected with each other via a bus 21. In addition, an input unit 17, a display unit 18, a sensor 19, and the network 5 are connected to the I/F 15. The input unit 17, the display unit 18 and the sensor 19 may be omitted in this configuration.

The CPU 11 is an arithmetic means, and controls the operation of the entire information processing apparatus. The RAM 13 is a volatile storage medium capable of reading and writing information at high speed, and is used as a work area when the CPU 11 processes information. The ROM 12 is a read-only nonvolatile storage medium, and stores programs such as firmware therein. The storage medium 14 is a nonvolatile storage medium, such as an HDD, capable of reading and writing information, and stores therein information such as an operating system (OS), various control programs, and application programs.

The I/F 15 connects between the bus 21 and the constituent elements such as the various hardware devices and the network 5, and controls them. The input unit 17 includes input devices such as a keyboard and a mouse for a user to input information into the information processing apparatus. The display unit 18 is a display device such as a liquid crystal display (LCD) for the user to check a status of the information processing apparatus.

The sensor 19 is a module for acquiring biometric information on a user, such as fingerprints, veins, and facial images. The sensor 19 may be omitted. In this configuration, the terminal apparatus 1 may acquire biometric information on a user via an information processing apparatus connected to the network 5 or the I/F 15.

In such a hardware configuration, the CPU 11 of the terminal apparatus 1 performs calculations in accordance with a program stored in the ROM 12 of the terminal apparatus 1, or a program loaded into the RAM 13 of the terminal apparatus 1 from the storage medium 14 of the terminal apparatus 1, thereby to implement software control units of the terminal apparatus 1.

The combination of the software control units configured above and the hardware allows to implement functional blocks that can realize functions of a controller 100 (see FIG. 4) of the terminal apparatus 1 according to the present example embodiment.

In the hardware configuration described above, the CPU 11 of the sub-parameter generation apparatus 2 performs calculations in accordance with a program stored in the ROM 12 of the sub-parameter generation apparatus 2, or a program loaded into the RAM 13 of the sub-parameter generation apparatus 2 from the storage medium 14 of the sub-parameter generation apparatus 2, thereby to implement software control units of the sub-parameter generation apparatus 2.

The combination of the software control units configured above and the hardware allows to implement functional blocks that can realize functions of a controller 200 (see FIG. 6) of the sub-parameter generation apparatus 2 according to the present example embodiment.

In the hardware configuration described above, the CPU 11 of the collation apparatus 3 performs calculations in accordance with a program stored in the ROM 12 of the collation apparatus 3, or a program loaded into the RAM 13 of the collation apparatus 3 from the storage medium 14 of the collation apparatus 3, thereby to implement software control units of the collation apparatus 3.

The combination of the software control units configured above and the hardware allows to implement functional blocks that can realize functions of a controller 300 (see FIG. 7) of the collation apparatus 3 according to the present example embodiment.

2.3. Overview of Cancelable Biometrics

Figure 3:
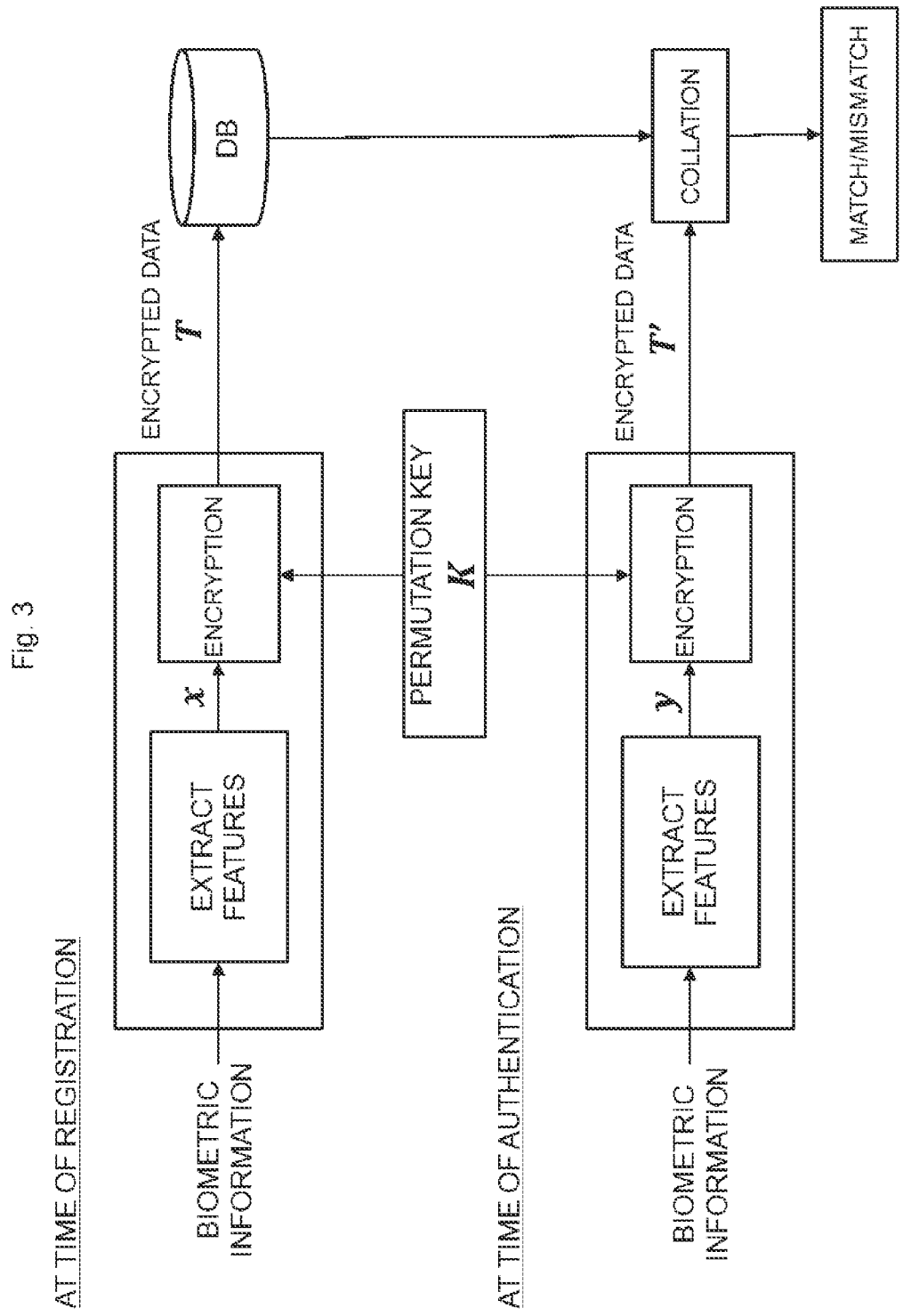
FIG. 3 is a diagram illustrating an overview of cancelable biometrics.

Next, referring to FIG. 3, an overview of cancelable biometrics, which can invalidate the registration information, will be described. FIG. 3 is a diagram illustrating an overview of the cancelable biometrics.

In the biometric authentication technology, biometric information on users such as fingerprints, veins, irises, and facial images is registered in advance, and the authentication is determined based on a comparison result between the registered information and biometric information which is input from a user for authentication. However, the leakage of biometric information leads to not only a problem related to personal information on a living body of which the biometric information is compromised, but also a problem impairing the security of an authentication system that uses the compromised biometric information on the living body.

To solve the above problem, a technology called "cancelable biometrics" has been used to protect biometric information on users, in which authentication is performed using registration information in which the biometric information is kept secret, and even if the registration information is compromised, the compromised registration information can be invalidated.

Here, with reference to FIG. 3, an overview of the cancelable biometrics will be described. First, when biometric information is registered, features are extracted from the biometric information. Here, for the sake of explanation, it is assumed that feature data, which is represented as a vector below, is extracted from the biometric information.

[Math. 1]

$$x = (x_1, x_2, \ldots, x_{n-1}, x_n)$$

Hereinafter, the feature data x, which is a vector, may be simply referred to as "feature data x". Then, one-way transformation (see Expression 1-1) is performed on the feature data x using a permutation key below to encrypt the feature data x.

$$K \quad \text{[Math. 2]}$$

Hereinafter, the permutation key K, which is a vector, may be simply referred to as "permutation key K". In addition, the encrypted data T, which is a vector, may be simply referred to as "encrypted data T". The permutation key K corresponds to a cryptographic key randomly generated. A transformation function F is a function for performing the one-way transformation (irreversible transformation) on input data (in this example, the feature data x).

[Math. 3]

$$T \leftarrow F_K(x) \quad \text{(Expression 1-1)}$$

As shown in (Expression 1-1), the encrypted data T corresponds to data obtained by transforming the feature data x through the transformation function F using the permutation key K. The encrypted data T is one of pieces of registration information to be used for collation, and is stored in a storage apparatus such as the DB 4.

Next, processing for authentication will be described. When authentication is performed, features are extracted from biometric information. Here, for the sake of explanation, it is assumed that feature data, which is represented as a vector below, is extracted from biometric information input for authentication.

[Math. 4]

$$y = (y_1, y_2, \ldots, y_{n-1}, y_n)$$

Hereinafter, the feature data y as a vector corresponds to respective examples of input information, second input information, and fourth input information in the present example embodiment. The feature data y, which is a vector, may be simply referred to as "feature data y". Then, the one-way transformation is performed on the feature data y using the permutation key K (Expression 1-2) to encrypt the feature data y. Hereinafter, encrypted data T', which is a vector, may be simply referred to as "encrypted data T'".

[Math. 5]

$$T' \leftarrow F_K(y) \quad \text{(Expression 1-2)}$$

As shown in (Expression 1-2), the encrypted data T' corresponds to data obtained by transforming the feature data y through the transformation function F using the same permutation key K as that used for the encrypted data T. The encrypted data T' corresponds to information to be collated against the encrypted data T. In the cancelable biometrics, the encrypted data T in which the feature data x is encrypted, and the encrypted data T' in which the feature data y is encrypted are collated in the respective encrypted states.

As shown in (Expression 1-1) and (Expression 1-2), in the cancelable biometrics, feature data is encrypted through the transformation function F using the same permutation key K at the time of registration and at the time of authentication. In other words, a similarity between the feature data x and the feature data y is preserved even after the transformation through the transformation function F using the permutation key K is performed.

It is assumed that feature data x and feature data y close to the feature data x are extracted as biometric information from a fingerprint on a middle finger of a right hand of the same person. The encrypted data T is generated by transforming the feature data x, and the encrypted data T' is generated by transforming the feature data y close to the feature data x. Since a similarity between the encrypted data T and the encrypted data T' is equal to a similarity between the feature data x and the feature data y, the encrypted data T and the encrypted data T' are close to each other.

Here, it is assumed that, for the same feature data x, a permutation key $$K_1 \quad \text{[Math. 6]}$$

and a permutation key $$K_2 \quad \text{[Math. 7]}$$

are used to perform transformation through the transformation function F. Hereinafter, the permutation key $K_1$, which is a vector, may be simply referred to as "permutation key $K_1$". In addition, the permutation key $K_2$, which is a vector, may be simply referred to as "permutation key $K_2$". Note that the permutation key $K_1 \neq$ the permutation key $K_2$. In this configuration, data $T_1$, which is a vector, is generated from the feature data x through the transformation function F using the transformation key $K_1$, and data $T_2$, which is a vector, is generated from the feature data x through the transformation function F using the transformation key $K_2$.

$$T_1 \leftarrow F_{K_1}(x) \quad \text{[Math. 8]}$$

$$T_2 \leftarrow F_{K_2}(x) \quad \text{[Math. 9]}$$

Hereinafter, the data $T_1$, which is a vector, may be simply referred to as "data $T_1$", and the data $T_2$, which is a vector, may be simply referred to as "data $T_2$".

As mentioned above, the transformation function F is a function for performing the one-way transformation on the input data. In other words, in the case of the permutation key $K_1 \neq$ the permutation key $K_2$, for the feature data x, the data $T_1$ output through the transformation function F using the permutation key $K_1$ is different from the data $T_2$ output through the transformation function F using the permutation key $K_2$. As mentioned above, the cancelable biometrics does not use information on the permutation keys $K_1$ and $K_2$ when collation is performed.

Then, when the data $T_2$ is collated with respect to the data $T_1$, a similarity between the data $T_1$ and the data $T_2$ do not match a similarity between the pieces of feature data x, even though both the pieces of data are generated by transforming the feature data x. In the above manner, the processing for the cancelable biometrics allows to generate the different pieces of data $T_1$ and $T_2$ by using the different permutation keys $K_1$ and $K_2$, respectively, for the same data. Using such characteristics, the cancelable biometrics allows to change the permutation key K thereby to invalidate the registration information stored in the database and the like. In the following description, the data transformation method in the cancelable biometrics may be referred to as "cancelable transformation".

2.4. Functional Configuration of Terminal Apparatus

Figure 4:
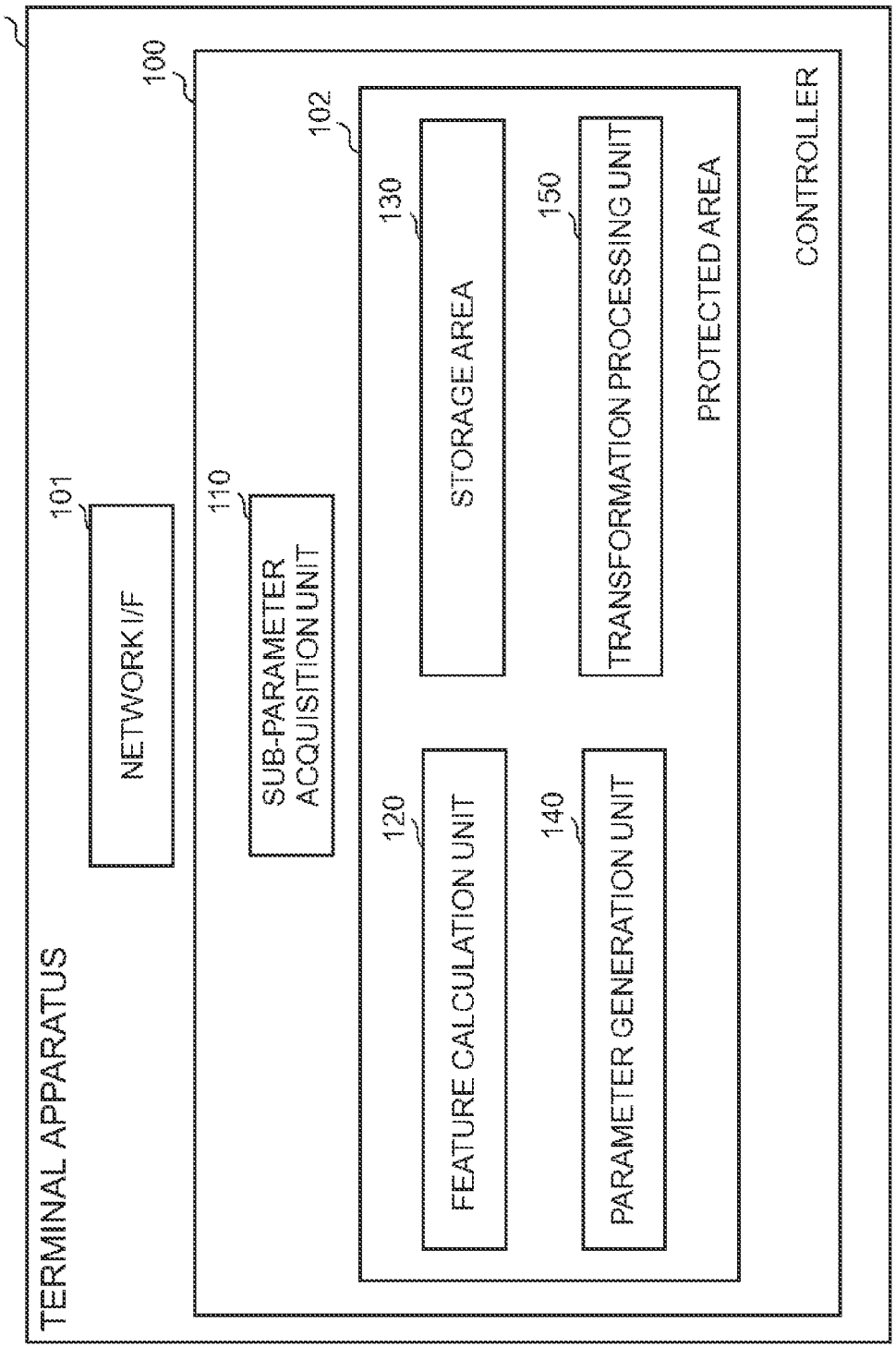
FIG. 4 is a functional block diagram illustrating a functional configuration of a terminal apparatus according to the first example embodiment.

Next, a functional configuration of the terminal apparatus 1 will be described. FIG. 4 is a functional block diagram illustrating a functional configuration of the terminal apparatus 1. As illustrated in FIG. 4, the terminal apparatus 1 includes the controller 100, and a network I/F 101 that is an interface for the controller 100 to exchange information with other devices via the network 5.

The controller 100 performs processing for encrypting information acquired via the network I/F 101. The controller 100 is implemented by installing a dedicated software program in the information processing apparatus such as the terminal apparatus 1. The controller 100 includes a sub-parameter acquisition unit 110, a feature calculation unit 120, a storage area 130, a parameter generation unit 140, and a transformation processing unit 150.

The sub-parameter acquisition unit 110 acquires a sub-parameter (e.g., sub-parameter vpi1 or vpi2) generated by the sub-parameter generation apparatus 2 via the network I/F 101. The sub-parameter acquisition unit 110 is an example of a terminal-side acquisition unit in the present example embodiment. The sub-parameter vpi1 is an example of a second parameter.

The feature calculation unit 120 performs processing for extracting features from biometric information on a user which is acquired by the sensor 19 of the terminal apparatus 1. Information on the features regarding the biometric information on the user may be input to the terminal apparatus 1. In this configuration, the feature calculation unit 120 may be omitted.

The storage area 130 stores therein a mask parameter (e.g., mask parameter vpm1) which is different from the sub-parameter and is used for generating a transformation parameter vp together with the sub-parameter. In the present example embodiment, the master parameter is a parameter which is uniquely defined for the terminal apparatus 1. The master parameter vpm1 is an example of a first parameter in the present example embodiment. The storage area 130 may store therein a first random number seed for generating a random number as the master parameter. The storage area 130 may also store therein, as the master parameter, a secret key for decrypting an encryption parameter. The storage area 130 is an example of a terminal-side storage area in the present example embodiment.

In a configuration in which the collation system 1000A includes another information processing apparatus having the elements corresponding to the terminal apparatus 1, the terminal apparatus 1 and the other information processing apparatus may store a common master parameter (e.g., master parameter vpm1). Further, the master parameter may be stored in the storage area 130 at the time of product shipment of the terminal apparatus 1 or at the time of activation of the terminal apparatus 1.

The parameter generation unit 140 performs transformation parameter generation processing for generating a transformation parameter based on the master parameter (e.g., master parameter vpm1) stored in the storage area 130, and the sub-parameter acquired from the sub-parameter generation apparatus 2. The transformation parameter is a parameter for encrypting information input to the terminal apparatus 1. Detailed example aspect of processing for generating the transformation parameter by the parameter generation unit 140 will be described later. The parameter generation unit 140 is an example of a transformation parameter generation unit in the present example embodiment.

The transformation parameter generated by the parameter generation unit 140 may be stored in the storage area 130. In this way, input information (e.g., feature data x or feature data y) input to the terminal apparatus 1 can be encrypted by using the transformation parameter stored in the storage area 130 without communication with the sub-parameter generation apparatus 2.

The transformation processing unit 150 encrypts the information input to the terminal apparatus 1 using the transformation parameter generated by the parameter generation unit 140 to thereby generate encrypted input information. The transformation processing unit 150 is an example of an encrypted information generation unit in the present example embodiment. The encrypted data T and the encrypted data T' are examples of pieces of encrypted input information, respectively, in the present example embodiment. The network I/F 101 transmits the encrypted input information generated by the transformation processing unit 150 to the collation apparatus 3.

When biometric information on a user of the terminal apparatus 1 is registered in the collation system 1000A for collation, the network I/F 101 transmits the encrypted input information generated by the transformation processing unit 150 to the DB 4. The DB 4 stores therein the encrypted input information received from the terminal apparatus 1 and identification information such as a user ID capable of identifying the user in association with each other. The identification information such as a user ID capable of identifying the user corresponds to information such as an identifier that is preset for each user or each terminal apparatus 1.

Figure 5:
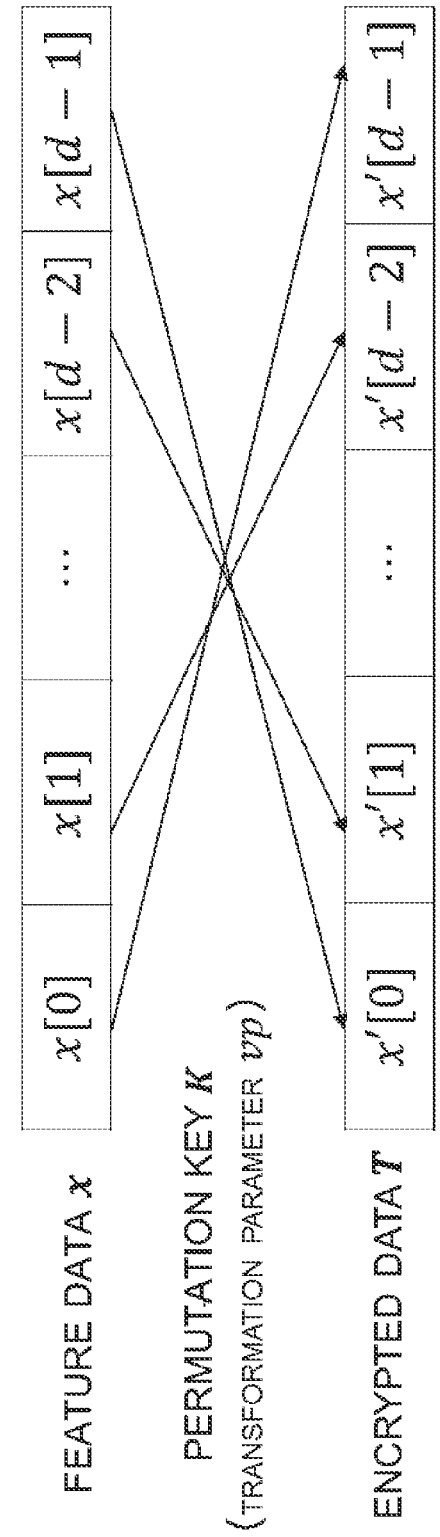
FIG. 5 is an explanation diagram for explaining encryption processing of information by a transformation processing unit according to the first example embodiment.

Referring to FIG. 5, detailed example aspect in which the transformation processing unit 150 encrypts information input to the terminal apparatus 1 will be described. FIG. 5 is an explanation diagram for explaining the encryption of information in the transformation processing unit 150. In FIG. 5, the explanation is based on the assumption that the feature data x is input to the terminal apparatus 1. The feature data x corresponds to respective examples of input information, first input information, and third input information in the present example embodiment. In FIG. 5, it is also assumed that the feature data x is a d-dimensional data set (i.e., the number of dimensions is d), as shown in (Expression 2-1).

[Math. 10]

$$x = (x[0], x[1], \ldots, x[d-2], x[d-1]) \qquad \text{(Expression 2-1)}$$

In the present example embodiment, the transformation processing unit 150 encrypts the feature data x based on the transformation parameter vp generated by the parameter generation unit 140. In the present example embodiment, the parameter generation unit 140 generates, as the transformation parameter vp, a permutation key K for performing the one-way transformation with respect to the sort order of dimensional elements in the feature data x.

The permutation key K defines, for example, parameters for permutating a 0-th dimensional element (x[0]) in the feature data x as a d-1-th dimensional element, permutating a first dimensional element (x[1]) in the feature data x as a d-2-th dimensional element, permutating a d-2-th dimensional element (x[d-2]) in the feature data x as a first dimensional element, and permutating d-1-th dimensional element (x[d-1]) in the feature data x as a 0-th dimensional element.

The transformation processing unit 150 encrypts the feature data x using the permutation key K to generate encrypted data below.

[Math. 11]

$$T = (x'[0], x'[1], \ldots, x'[d-2], x'[d-1])  \quad \text{(Expression 2-2)}$$

The encrypted data T is an example of encrypted input information in the present example embodiment.

In other words, the transformation processing unit 150 permutates the 0-th dimensional element (x[0]) in the feature data x as the d-1-th dimensional element (x'[d-1]) in the encrypted data T. The transformation processing unit 150 also permutates the first dimensional element (x[1]) in the feature data x as the d-2-th dimensional element (x'[d-2]) in the encrypted data T. Further, the transformation processing unit 150 permutates the d-2—the dimensional element (x[d-2]) in the feature data x as the first dimensional element (x'[1]) in the encrypted data T. In addition, the transformation processing unit 150 permutates the d-1-th dimensional element (x[d-1]) in the feature data x as the 0-th dimensional element (x'[0]) in the encrypted data T. In other words, the transformation processing unit 150 generates the encrypted data T by permutating the elements in the feature data x using the permutation key K.

In the present example embodiment, the feature calculation unit 120, the storage area 130, the parameter generation unit 140, and the transformation processing unit 150 are provided in a protected area 102 in the terminal apparatus 1. The protected area 102 refers to a secure world which is constructed in isolation from a normal area in the controller 100 on a memory space (ROM 12 or RAM 13) in the terminal apparatus 1 by means of technologies such as TrustZone (registered trademark) of Arm, Inc. or KeyStone of the RISC-V Foundation, and is more secure than the normal area in the controller 100. Confidential information is stored in the protected area 102 constructed in the terminal apparatus 1, and security processing is implemented in the protected area 102. This prevents the leakage of confidential information, and the tampering with various processes performed in the terminal apparatus 1.

Since the normal area in the controller 100 is a non-secure space, elements provided on the normal area in the controller 100 cannot directly access the protected area 102, which is a secure space. Therefore, in the present example embodiment, the protected area 102 is provided in the controller 100. The feature calculation unit 120, the storage area 130, the parameter generation unit 140, and the transformation processing unit 150 are implemented in the protected area 102. This configuration allows to further prevent the leakage of pieces of information such as the master parameter vpm1 of the terminal apparatus 1, the transformation parameter vp generated by the parameter generation unit 140, and the encrypted data T.

2.5. Functional Configuration of Sub-Parameter Generation Apparatus

Figure 6:
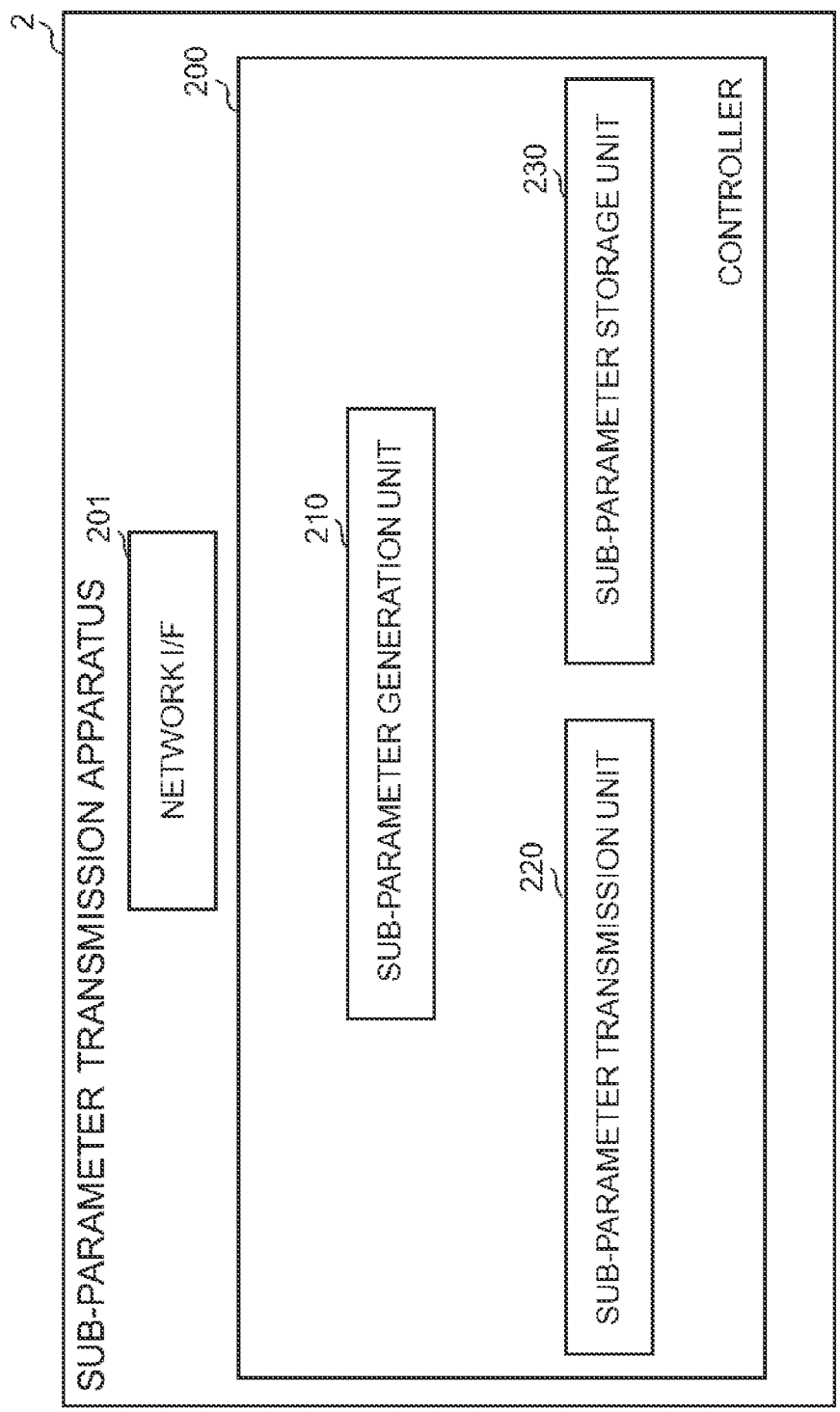
FIG. 6 is a functional block diagram illustrating a functional configuration of a sub-parameter generation apparatus according to the first example embodiment.

Next, with reference to FIG. 6, a functional configuration of the sub-parameter generation apparatus 2 will be described. FIG. 6 is a functional block diagram illustrating a functional configuration of the sub-parameter generation apparatus 2. As illustrated in FIG. 6, the sub-parameter generation apparatus 2 includes the controller 200, and a network I/F 201 that is an interface for the controller 200 to exchange information with other devices via the network 5.

The controller 200 performs processing for generating a sub-parameter (e.g., sub-parameter vpi1, or sub-parameter vpi2), and processing for transmitting the sub-parameter to the terminal apparatus 1 and the collation apparatus 3 via the network I/F 101. The controller 200 is implemented by installing a dedicated software program in the information processing apparatus such as the sub-parameter generation apparatus 2. The controller 200 includes a sub-parameter generation unit 210, a sub-parameter transmission unit 220, and a sub-parameter storage unit 230.

The sub-parameter generation unit 210 generates a sub-parameter vpi1 for the terminal apparatus 1 to generate the transformation parameter vp. The sub-parameter generation unit 210 generates, for example, a second random number seed for generating a random number as the sub-parameter vpi1. The sub-parameter generation unit 210 can also generate a sub-parameter (e.g., sub-parameter vpi2) which is different from the sub-parameter vpi1.

The sub-parameter transmission unit 220 transmits the sub-parameter vpi1 (or sub-parameter vpi2) generated by the sub-parameter generation unit 210 to the terminal apparatus 1 and/or the collation apparatus 3 via the network I/F 201.

The sub-parameter storage unit 230 stores therein the sub-parameters such as the sub-parameter vpi1 and sub-parameter vpi2 generated by the sub-parameter generation unit 210. The sub-parameter storage unit 230 may store therein identification information for identifying the terminal apparatus 1 that is the destination of the sub-parameter vpi1 (or sub-parameter vpi2), or identification information for identifying a user who has input biometric information to the terminal apparatus 1 that is the destination of the sub-parameter vpi1 (or sub-parameter vpi2), in association with the sub-parameter vpi1.

2.6. Functional Configuration of Collation Apparatus

Figure 7:
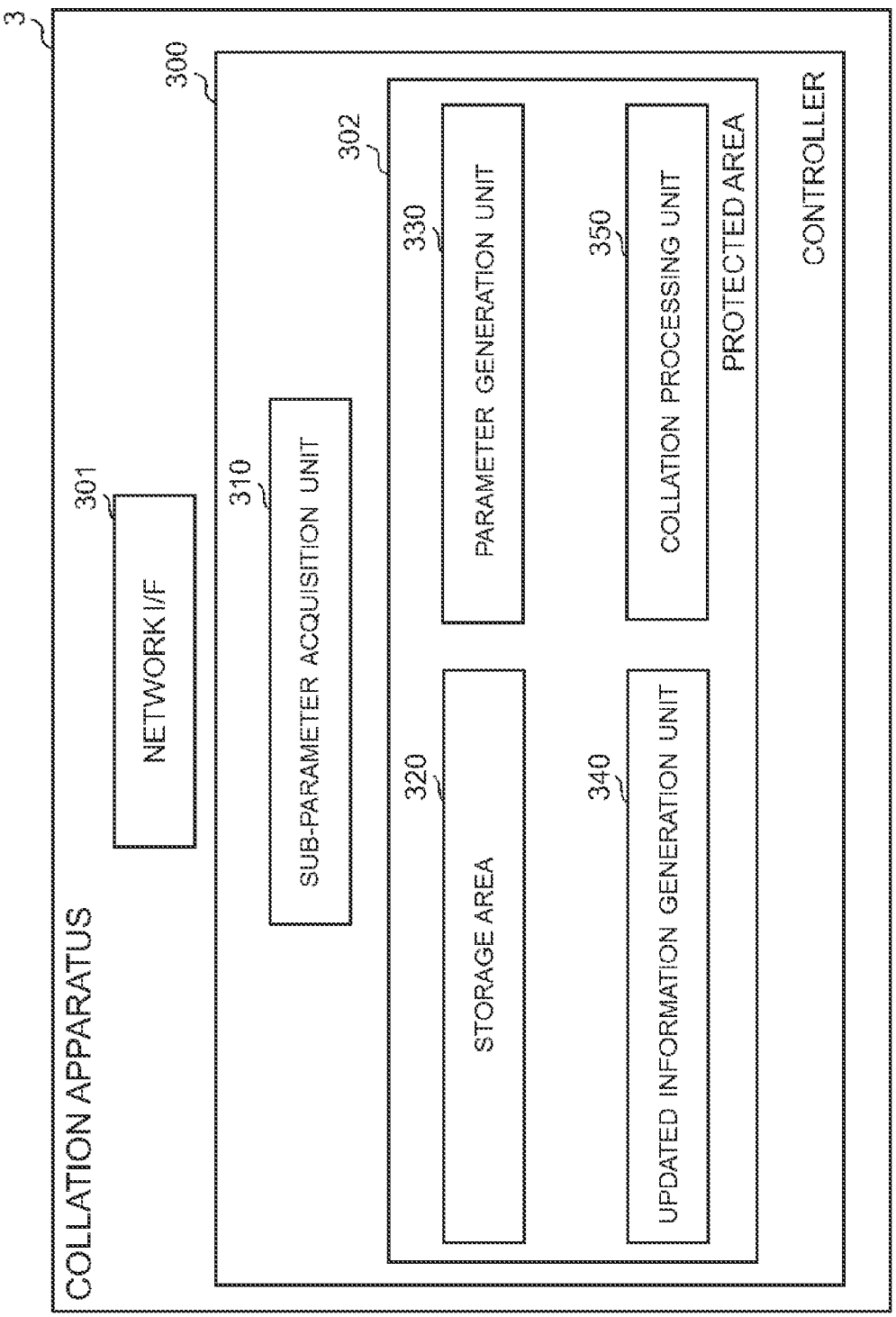
FIG. 7 is a functional block diagram illustrating a functional configuration of a collation apparatus according to the first example embodiment.

Furthermore, with reference to FIG. 7, a functional configuration of the collation apparatus 3 will be described. FIG. 7 is a functional block diagram illustrating a functional configuration of the collation apparatus 3. As illustrated in FIG. 7, the collation apparatus 3 includes the controller 300, and a network I/F 301 that is an interface for the controller 300 to exchange information with other devices via the network 5.

The controller 300 performs processing for collating pieces of information acquired via the network I/F 301. The controller 300 is implemented by installing a dedicated software program in the information processing apparatus such as the collation apparatus 3. The controller 300 includes a sub-parameter acquisition unit 310, a storage area 320, a parameter generation unit 330, an updated information generation unit 340, and a collation processing unit 350.

The sub-parameter acquisition unit 310 acquires the sub-parameters (e.g., sub-parameter vpi1 and sub-parameter vpi2) generated by the sub-parameter generation apparatus 2 via the network I/F 301. The sub-parameter acquisition unit 310 is an example of a transformation-side acquisition unit in the present example embodiment.

The storage area 320 stores therein a parameter which is different from the sub-parameters vpi1 and vpi2, and which is the same as the master parameter used in the terminal apparatus 1 to generate the transformation parameter vp (e.g., master parameter vpm1). As mentioned above, the master parameter vpm1 is a parameter that is uniquely defined for the terminal apparatus 1. In the present example embodiment, the storage area 320 stores therein the master parameter stored in the terminal apparatus 1 that may be connected to the collation apparatus 3. In other words, in the case in which the terminal apparatus 1 and other information processing apparatuses having elements corresponding to the terminal apparatus 1 are connected to the collation apparatus 3, the storage area 320 may store therein a plurality of master parameters including the master parameter vpm1 of the terminal apparatus 1. The storage area 320 is an example of a transformation-side storage area in the present example embodiment.

The parameter generation unit 330 generates an encryption transformation parameter vp' for transforming the encrypted input information received from the terminal apparatus 1, based on the master parameter vpm1 stored in the storage area 320, and the sub-parameters vpi1 and vpi2 acquired from the sub-parameter generation apparatus 2. Specifically, the parameter generation unit 330 uses the master parameter vpm1 stored in the storage area 320, the sub-parameter vpi1 received from the sub-parameter generation apparatus 2, and a sub-parameter different from the sub-parameter vpi1 (for example, sub-parameter vpi2) to generate the encryption transformation parameter vp'. Detailed example aspect of processing for generating the encryption transformation parameter vp' by the parameter generation unit 330 will be described later. The parameter generation unit 330 is an example of an encryption transformation parameter generation unit in the present example embodiment.

Figure 8:
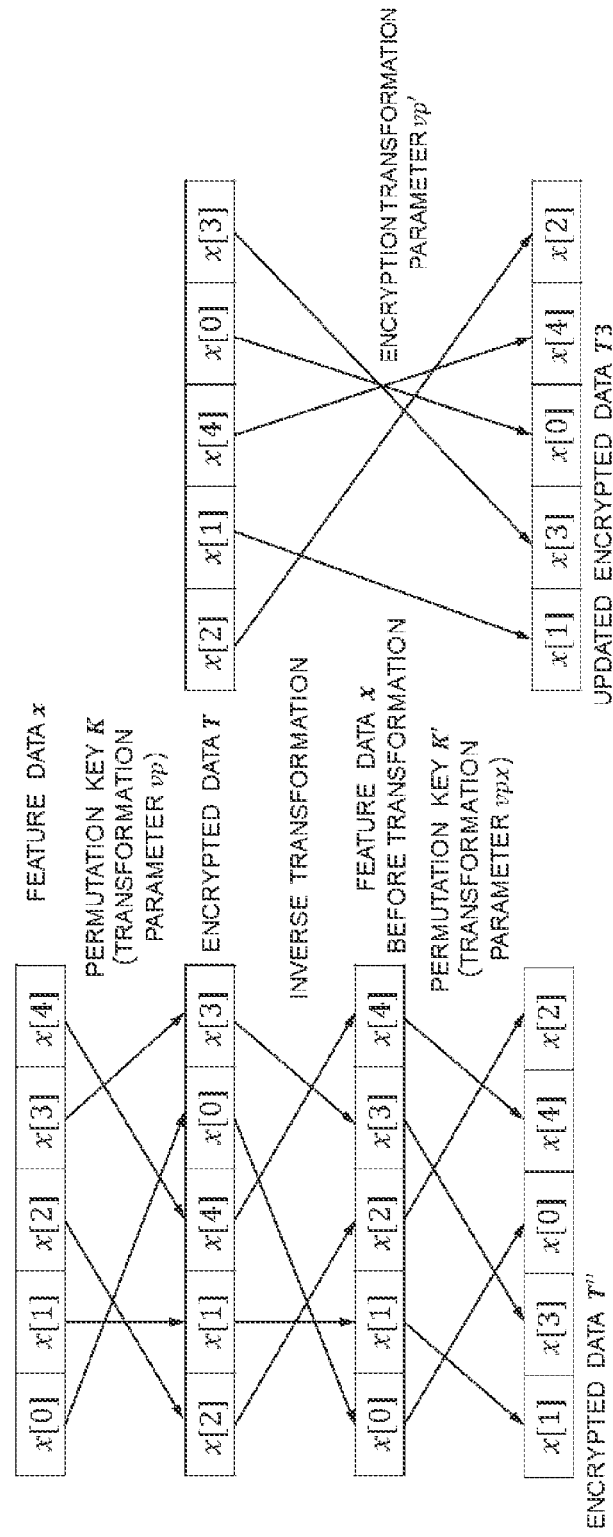
FIG. 8 is an explanation diagram for explaining a process transforming encrypted input information by an updated information generation unit according to the first example embodiment.

The updated information generation unit 340 transforms the encrypted input information received from the terminal apparatus 1 using the encryption transformation parameter vp' generated by the parameter generation unit 330 to thereby generate updated encrypted input information. With reference to FIG. 8, detailed example aspect in which the updated information generation unit 340 encrypts the encrypted input information acquired from the terminal apparatus 1 will be described.

FIG. 8 is an explanation diagram for explaining a process for transforming the encrypted input information by the updated information generation unit 340. In FIG. 8, the explanation is based on the assumption that the updated information generation unit 340 transforms the encrypted data T using the transformation parameter vp. In FIG. 8, it is also assumed that the feature data x is a 5-dimensional data set (i.e., the number of dimensions is 5), as shown in (Expression 3-1) (see the top row on the left side in FIG. 8).

[Math. 12]

$$x = (x[0], x[1], x[2], x[3], x[4]) \quad \text{(Expression 3-1)}$$

As described above, the transformation processing unit 150 encrypts the feature data x using the transformation parameter vp to generate the encrypted data T. In the present example embodiment, the parameter generation unit 140 generates, as the transformation parameter vp, the permutation key K for performing the one-way transformation with respect to the sort order of dimensional elements in the feature data x.

The permutation key K defines, for example, parameters for permutating a 0-th dimensional element (x[0]) in the feature data x as a fourth dimensional element, permutating a first dimensional element (x[1]) in the feature data x as a first dimensional element, permutating a second dimensional element (x[2]) in the feature data x as a 0-th dimensional element, permutating a third dimensional element (x[3]) in the feature data x as a fourth dimensional element, and permutating a fourth dimensional element (x[4]) in the feature data x as a second dimensional element.

In the terminal apparatus 1, the transformation processing unit 150 encrypts the feature data x using the permutation key K to generate encrypted data below (see the second row from the top on the left side in FIG. 8).

[Math. 13]

$$T = (x[2], x[1], x[4], x[0], x[3]) \quad \text{(Expression 3-2)}$$

The terminal apparatus 1 then transmits the encrypted data T to the collation apparatus 3.

Here, it is assumed that the encrypted data T is decrypted to the feature data x. In this case, by performing inverse transformation on the encrypted data T using the permutation key K, the feature data x shown in (Expression 3-1) can be obtained from the encrypted data T shown in (Expression 3-2) (see the third row from the top on the left side in FIG. 8).

In another example, it is assumed that the cancelable transformation is performed on the feature data x using a permutation key K' (e.g., parameter vpx) that is different from the permutation key K. The cancelable transformation using the permutation key K' is performed on the feature data x to thereby generate encrypted data below (see the bottom row on the left side in FIG. 8).

[Math. 14]

$$T'' = (x[1], x[3], x[0], x[4], x[2]) \quad \text{(Expression 3-3)}$$

Hereafter, the encrypted data T'', which is a vector, may be simply described as "encrypted data T''".

As shown in (Expression 3-2) and (Expression 3-3), the sort order of elements in the encrypted data T'' generated using the permutation key K' for the feature data x is different from the sort order of elements in the encrypted data T generated using the permutation key K for the feature data x. In this way, the cancelable transformation allows to invalidate the encrypted data T generated using the permutation key K for the feature data x by the encrypted data T'' generated using the permutation key K' for the feature data x.

However, the inverse transformation of the encrypted data T by the permutation key K increases the risk of leakage of the feature data x, which is unencrypted data. In view of such a problem, the present example embodiment allows the updated information generation unit 340 to transform the encrypted data T without inverse transforming the encrypted data T into the feature data x.

In the present example embodiment, the storage area 130 and the memory area 320 store the master parameter vpm1 therein. The master parameter vpm1 is a parameter to be used to generate the transformation parameter vp in the terminal apparatus 1. The sub-parameter acquisition unit 310 receives the sub-parameter vpi1 from the sub-parameter generation apparatus 2. The sub-parameter vpi1 is a parameter transmitted from the sub-parameter generation apparatus 2 to the terminal apparatus 1 to generate the transformation parameter vp.

The sub-parameter generation apparatus 2 can transmit a sub-parameter (e.g., sub-parameter vpi2), which is different from the sub-parameter vpi1, to the collation apparatus 3. The parameter generation unit 330 generates the encryption transformation parameter vp' by using the master parameter vpm1, the sub-parameter vpi1 and the sub-parameter vpi2. The encryption transformation parameter vp' is a parameter for transforming the encrypted data T into updated encrypted data T3.

The updated information generation unit 340 transforms the encrypted data T using the encryption transformation parameter vp' (see the upper row on the right side in FIG. 8) to thereby generate the updated encrypted data T3 (see the lower row on the right side in FIG. 8). The updated encrypted data T3 is an example of updated encrypted input information in the present example embodiment. As illustrated in FIG. 8, the sort order of elements in the updated encrypted data T3 is the same as the sort order of elements in the encrypted data T".

In the case in which the feature data y is close to the feature data x, assume that the cancelable transformation using the permutation key K' is performed on the feature data y. Since the feature data y and the feature data x are close to each other, the feature data y is transformed into the encrypted data T" by using the permutation key K'. Also in this case, the sort order of elements in the updated encrypted data T3 is the same as the sort order of elements in the encrypted data T" generated by performing the cancelable transformation on the feature data y using the permutation key K'.

In other words, the updated information generation unit 340 can transform the encrypted data T using the encryption transformation parameter vp' to thereby generate the updated encrypted data T3. As mentioned above, the updated encrypted data T3 is a data set corresponding to the encrypted data T" obtained by encrypting the feature data x using the permutation key K' (i.e., the transformation parameter vpx) (see FIG. 8). In the present example embodiment, the above processing allows to invalidate the encrypted data T without decrypting the encrypted data T to the feature data x in the collation apparatus 3.

The collation processing unit 350 performs collation processing for collating the encrypted data (e.g., encrypted data T' or encrypted data T") acquired from the terminal apparatus 1 with the encrypted input information stored in the DB 4. As described above, the terminal apparatus 1 generates the transformation parameter vp based on the master parameter vpm1 stored in the storage area 130 and the sub-parameter vpi1 received from the sub-parameter generation apparatus 2. In the present example embodiment, the sub-parameter generation apparatus 2 may transmit a sub-parameter different from the sub-parameter vpi1 (e.g., sub-parameter vpi2) to the terminal apparatus 1 due to maintenance, version changes, etc. of the collation system 1000A. In such a case, when encrypting information input to the terminal apparatus 1, the transformation parameter (e.g., transformation parameter vpx), which is generated based on the master parameter vpm1 stored in the storage area 130 and the sub-parameter vpi2 received from sub-parameter generation apparatus 2, is used.

As described above, even if the sub-parameter to be used in the terminal apparatus 1 is changed from the sub-parameter vpi1 to the sub-parameter vpi2, the parameter generation unit 330 generates the encryption transformation parameter vp' by using the sub-parameters vpi1 and vpi2, and the master parameter vpm1 stored in the storage area 320. This configuration allows the updated information generation unit 340 to transform the encrypted data T into the updated encrypted data T3.

The collation processing unit 350 acquires from the terminal apparatus 1 the data (encrypted data T' or encrypted data T") obtained by encrypting the feature data y, and collates it with the encrypted data T. As described above, as long as the same permutation key K is used for encryption in the terminal apparatus 1, a similarity between the data (encrypted data T') obtained by encrypting the data close to the feature data x (e.g., feature data y extracted from a fingerprint of a right middle finger of the same person) using the permutation key K and the encrypted data T matches a similarity between the feature data x and the feature data y.

On the other hand, it is assumed that the feature data y is encrypted by the terminal apparatus 1 using the permutation key K' that is different from the permutation key K. In such a case, the similarity between the data obtained by encrypting the feature data y using the permutation key K' (i.e., data corresponding to the encrypted data T") and the encrypted data T does not match the similarity between the feature data x and the feature data y.

The collation processing unit 350 performs the collation processing for performing collation between the encrypted data (e.g., encrypted data T) obtained from the DB 4 and the encrypted data (e.g., encrypted data T' or encrypted data T") received from the terminal apparatus 1. The collation processing unit 350 outputs a result of the collation processing. The result of the collation processing by the collation processing unit 350 corresponds to information indicating, for example, a similarity between the encrypted data T and the encrypted data T' or a similarity between the encrypted data T and the encrypted data T".

In the present example embodiment, the storage area 320, the parameter generation unit 330, the updated information generation unit 340, and the collation processing unit 350 are provided in the protected area 302 in the collation apparatus 3. Similar to the protected area 102, the protected area 302 refers to a secure world which is constructed in isolation from a normal area in the controller 300 on a memory space (ROM 12 or RAM 13) in the collation apparatus 3 by means of technologies such as TrustZone of Arm, Inc. or KeyStone of the RISC-V Foundation, and is more secure than the normal area in the controller 300. Confidential information is stored in the protected area 302 constructed in the collation apparatus 3, and security processing is implemented in the protected area 302. This prevents the leakage of confidential information, and the tampering with various processes performed in the collation apparatus 3.

Since the normal area in the controller 300 is a non-secure space, elements in the normal area in the controller 300 cannot directly access the protected area 302, which is a secure space. Therefore, in the present example embodiment, the protected area 302 is provided in the controller 300. The storage area 320, the parameter generation unit 330, the updated information generation unit 340, and the collation processing unit 350 are implemented in the protected area 302. This configuration allows to further prevent the leakage of pieces of information such as the master parameter of the collation apparatus 3, the encryption transformation parameter vp' generated by the parameter generation unit 330, the encrypted data T, the encrypted data T', and the encrypted data T".

The collation processing unit 350 may be implemented in a protected area of an information processing apparatus different from the collation apparatus 3.

2.7. Flow of Processing of Encrypting Feature Data in Collation System

Figure 9:
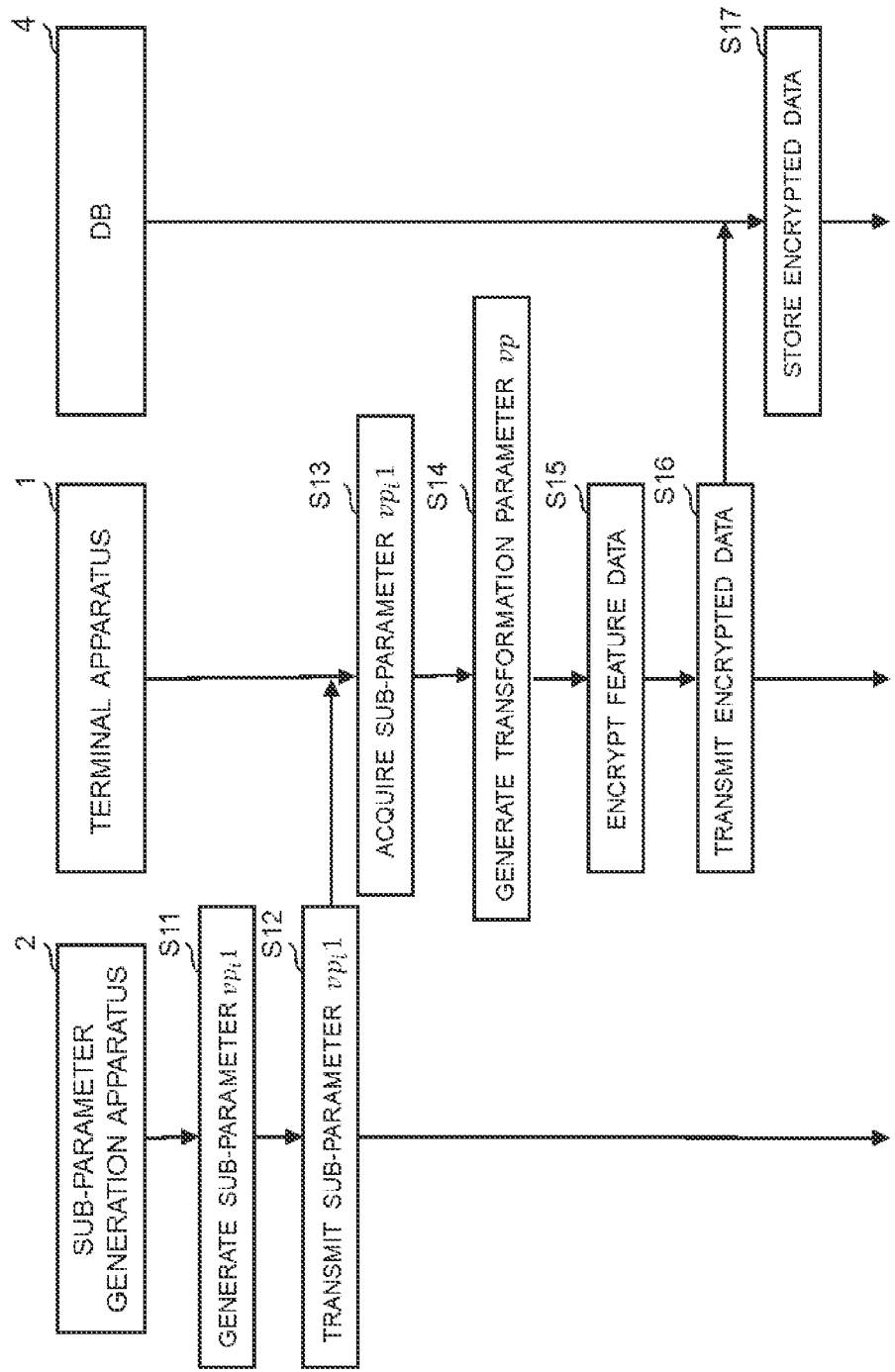
FIG. 9 is a sequence diagram illustrating a flow of processing of encrypting feature data according to the first example embodiment.

Next, a flow of processing of encrypting the feature data x will be described with reference to FIG. 9. FIG. 9 is a sequence diagram illustrating a flow of processing of encrypting the feature data x. FIG. 9 illustrates an example in which the sub-parameter generation apparatus 2 transmits the sub-parameter vpi1 to the terminal apparatus 1, but the sub-parameter generation apparatus 2 may also generate a sub-parameter (e.g., sub-parameter vpi2) other than the sub-parameter vpi1, and transmit it to the terminal apparatus 1.

In step S11, the sub-parameter generation unit 210 generates the sub-parameter vpi1. In step S12, the sub-parameter transmission unit 220 transmits the sub-parameter vpi1 to the terminal apparatus 1.

In step S13, the sub-parameter acquisition unit 110 acquires the sub-parameter vpi1 from the sub-parameter generation apparatus 2. The terminal apparatus 1 acquires the sub-parameter vpi1 from the sub-parameter generation apparatus 2. This allows the terminal apparatus 1 to encrypt the feature data x. The sub-parameter generation apparatus 2 may only be online when transmitting the sub-parameter vpi1 to the terminal apparatus 1.

In step S14, the parameter generation unit 140 generates the transformation parameter vp based on the sub-parameter vpi1 and the master parameter vpm1 stored in the storage area 130.

In a configuration in which the master parameter vpm1 is a first random number seed and the sub-parameter vpi1 is a second random number seed, the parameter generation unit 140 generates random numbers using the first and second random number seeds. The random number generated by the parameter generation unit 140 is an example of the transformation parameter vp.

In a configuration in which the master parameter vpm1 is a secret key and the sub-parameter vpi1 is an encrypted parameter, the parameter generation unit 140 decrypts the encrypted parameter with the secret key. The encrypted parameter to be decrypted by the parameter generation unit 140 is an example of the transformation parameter vp.

In step S15, the transformation processing unit 150 encrypts the feature data x using the transformation parameter vp to thereby generate the encrypted data T. In the case in which the parameter generation unit 140 generates a random number as the transformation parameter vp in step S14, the transformation processing unit 150 encrypts the feature data x using the random number generated by the parameter generation unit 140.

In the present example embodiment, the feature data x is an example of input information to be input to the terminal apparatus 1 for collation. In the present example embodiment, the encrypted data T is an example of encrypted input information.

In step S16, the network I/F 101 transmits to the DB 4 the encrypted data T and identification information capable of identifying a user of the terminal apparatus 1 from which the feature data x is extracted. In step S17, the DB 4 stores the encrypted data T received from the terminal apparatus 1 and the identification information capable of identifying the terminal apparatus 1 (or the user of the terminal apparatus 1) from which the feature data x is extracted, in association with each other. The encrypted data T corresponds to respective examples of first encrypted input information and third encrypted input information for collation by the collation apparatus 3.

FIG. 10 is a diagram illustrating a configuration of information stored in the DB 4. As illustrated in FIG. 10, data corresponding to No. 1 in the DB 4 includes information indicating "v1" as version information, information indicating the "encrypted data T" as the encrypted data, and information indicating "EwFsih" as the identification information, in association with each other. In addition, data corresponding to No. 2 in the DB 4 includes information indicating "v2" as the version information, information indicating the "encrypted data TR" as the encrypted data, and information indicating "u1WLMo" as the identification information, in association with each other.

In the data corresponding to No. 1 in FIG. 10, "v1" is stored as the version information. "v" indicates that the encrypted data T has been generated using the sub-parameter vpi1.

The identification information is information for identifying the terminal apparatus which has extracted the feature data used to generate the encrypted data. In the data corresponding to No. 1 in FIG. 10, "EwFsih", which indicates that the encrypted data T has been generated by the terminal apparatus 1, is stored as the identification information.

The terminal apparatus 1 performs the processing of step S15 using the transformation parameter vp on the feature data y input to the terminal apparatus 1 for collation, to thereby generate the encrypted data T'.

When encrypting the feature data y, the parameter generation unit 140 may acquire the sub-parameter vpi2 different from the sub-parameter vpi1, perform the processing of step S14, and generate the transformation parameter vpx. In this case, the terminal apparatus 1 performs the processing of step S15 using the transformation parameter vpx for the feature data y input to the terminal apparatus 1 for collation, to thereby generate the encrypted data T". The transformation parameter vpx is an example of a terminal-side update transformation parameter in the present example embodiment.

2.8. Flow of Processing of Performing Collation in Collation System

2.8.1. Example 1

In the following, an example of a flow of collation processing in the collation system 1000A will be described. As Example 1, a flow of processing when the collation apparatus 3 does not transform the encrypted data T into the updated encrypted data T3 will be described. In other words, a flow of processing when the terminal apparatus 1 encrypts the feature data x and the feature data y using transformation parameter vp will be described.

The encrypted data T' corresponds to respective examples of second encrypted input information and fourth encrypted input information for collation by the collation apparatus 3 in Example 1. The feature data x corresponds to respective examples of first input information and third input information in Example 1. The feature data y corresponds to respective examples of second input information and fourth input information in Example 1.

Figure 11:
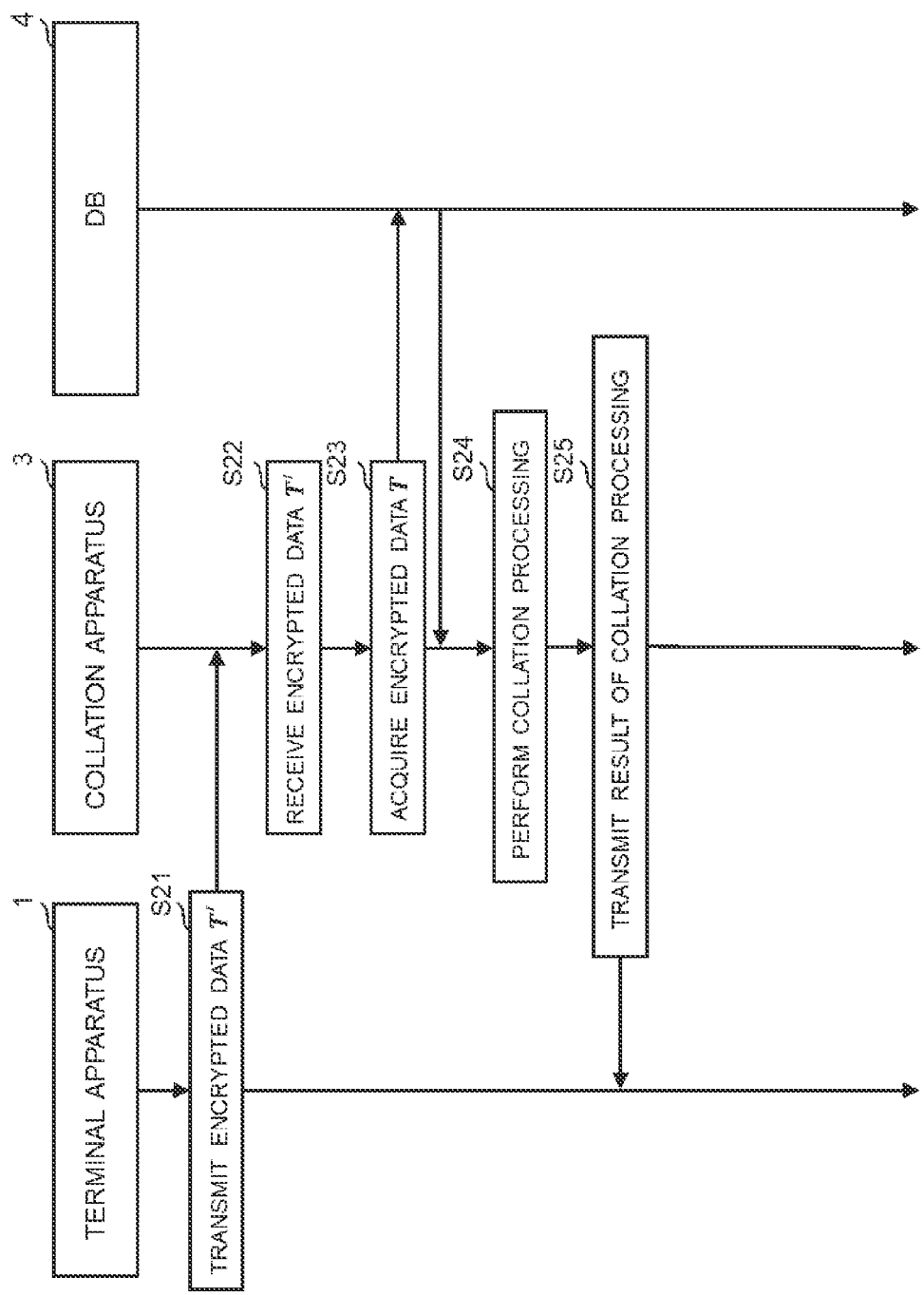
FIG. 11 is a sequence diagram illustrating a flow of processing of collating encrypted information according to Example 1 of the first example embodiment.

With reference to FIG. 11, a flow of processing of performing collation between the encrypted data T and the encrypted data T' in Example 1 will be described. FIG. 11 is a sequence diagram illustrating a flow of processing of performing collation between the encrypted data T and the encrypted data T' in the collation system 1000A. As described above, the encrypted data T' corresponds to the data obtained by encrypting the feature data y using the transformation parameter vp generated from the sub-parameter vpi1. It is assumed that the identification information for identifying the user of the terminal apparatus 1 from which the feature data x has been extracted and the identification information for identifying the user of the terminal apparatus 1 from which the feature data y has been extracted are the same.

In step S21, the network I/F 101 transmits to the collation apparatus 3 the encrypted data T' and the identification information identifying the user of the terminal apparatus 1 from which the feature data y has been extracted. In step S22, the network I/F 301 receives the encrypted data T' and the identification information which are transmitted by the terminal apparatus 1, the identification information identifying the user of the terminal apparatus 1 from which the feature data y has been extracted.

In step S23, the collation processing unit 350 acquires the encrypted data T from the DB 4. The encrypted data T is information corresponding to the identification information identifying the user of the terminal apparatus 1 that is received together with the encrypted data T' in step S22.

In step S24, the collation processing unit 350 collates the encrypted data T' received in step S22 with the encrypted data T acquired in step S23. In step S25, the collation processing unit 350 transmits a result of the collation processing in step S25 to the terminal apparatus 1.

As described above, the terminal apparatus 1 encrypts the feature data x and the feature data y using the transformation parameter vp to generate the encrypted data T and the encrypted data T', respectively. The feature data x and the feature data y are close to each other. In this configuration, the collation processing unit 350 transmits to the terminal apparatus 1 a collation result that the encrypted data T and the encrypted data T' are close to each other. The terminal apparatus 1 may authenticate the user of the terminal apparatus 1 based on the result of the collation processing received from the collation apparatus 3.

Figure 12:
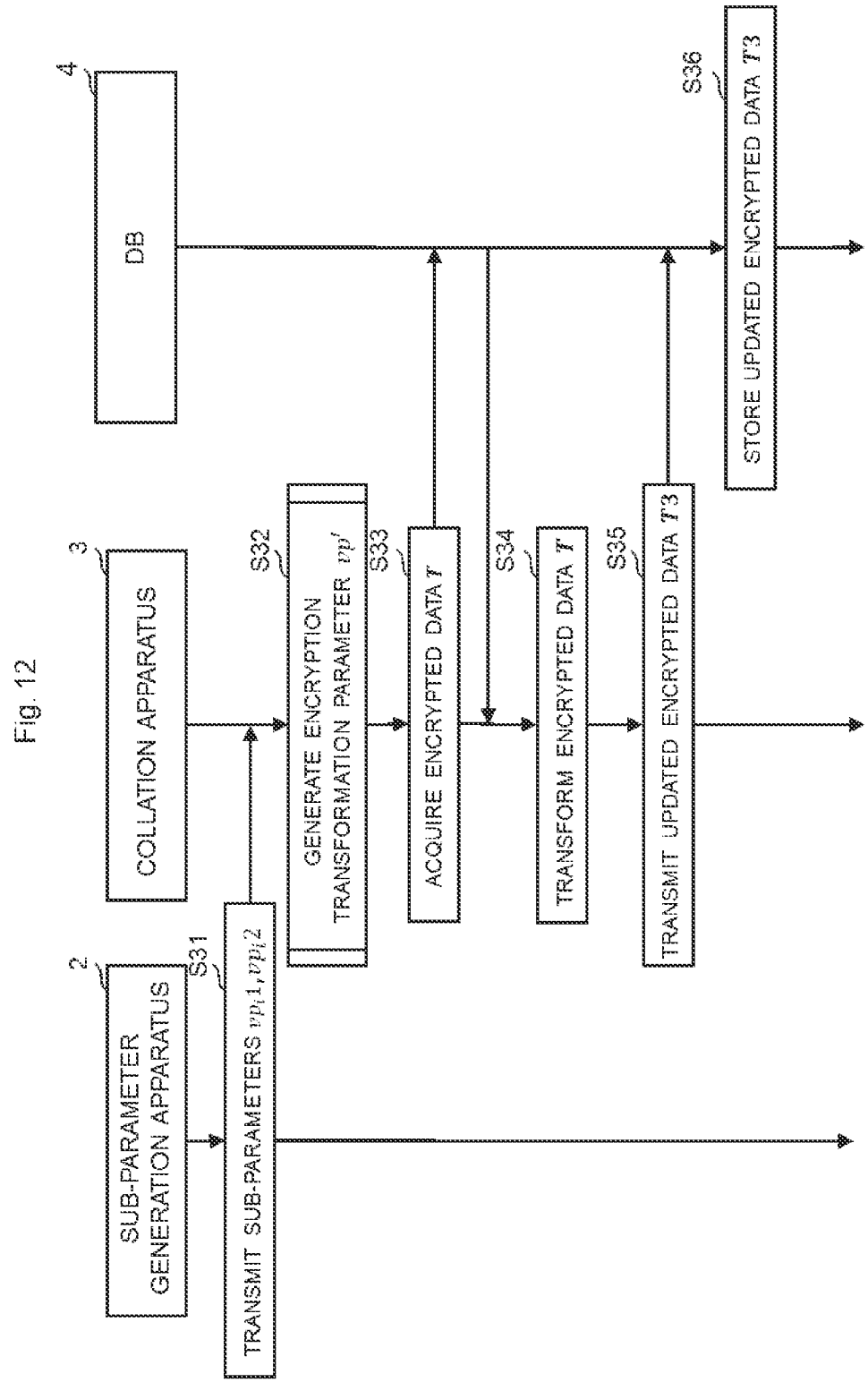
FIG. 12 is a sequence diagram illustrating a flow of encrypted data transformation processing according to the first example embodiment.

Next, the following describes a flow of encrypted data transformation processing in the collation system 1000A when the terminal apparatus 1 generates the transformation parameter vpx using the sub-parameter vpi2 for encryption due to maintenance or version change in the present example embodiment. FIG. 12 is a sequence diagram illustrating a flow of encrypted data transformation processing.

In step S31, the sub-parameter generation apparatus 2 transmits the sub-parameters vpi1 and vpi2 to the collation apparatus 3. The terminal apparatus 1 generates the transformation parameter vp based on the master parameter vpm1 and the sub-parameter vpi1. In addition, the terminal apparatus 1 generates the transformation parameter vpx based on the master parameter vpm1 and the sub-parameter vpi2.

In step S32, the collation apparatus 3 generates the encryption transformation parameter vp' based on the sub-parameters vpi1 and vpi2, and the master parameter vpm1.

Figure 13:
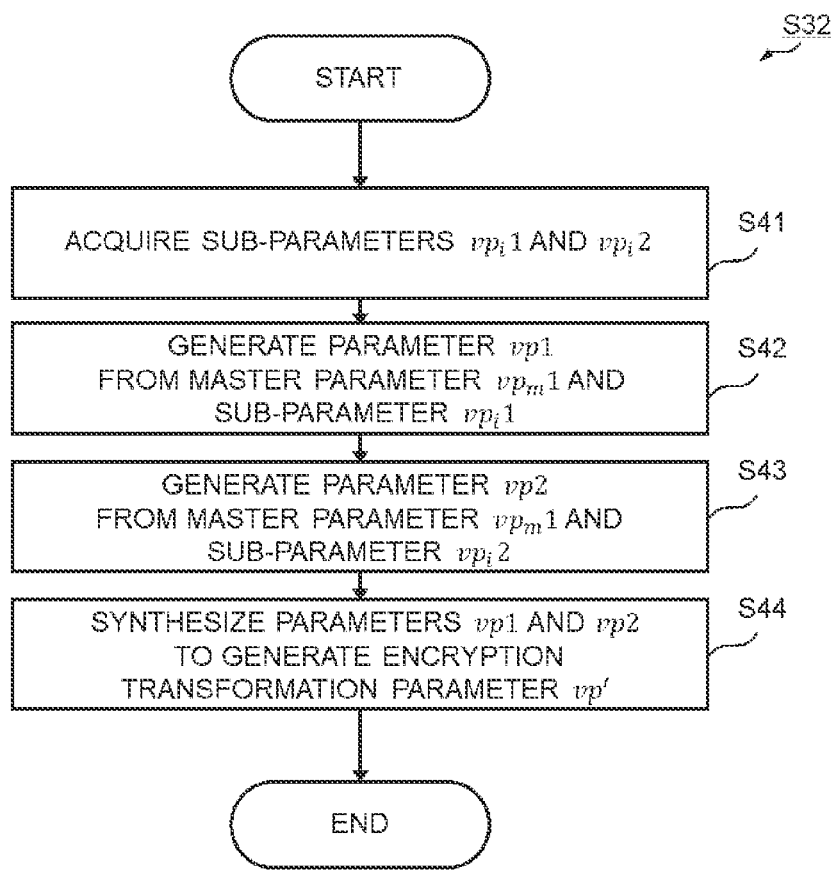
FIG. 13 is a flowchart illustrating a flow of processing of generating an encryption transformation parameter according to the first example embodiment.

Here, a flow of processing for generating the encryption transformation parameter vp' will be described with reference to FIG. 13. FIG. 13 is a flowchart illustrating a flow of processing for generating the encryption transformation parameter vp'.

In step S41, the sub-parameter acquisition unit 310 acquires the sub-parameters vpi1 and vpi2 from the sub-parameter generation apparatus 2 via the network I/F 301.

In step S42, the parameter generation unit 330 generates a parameter vp1 from the master parameter vpm1 and the sub-parameter vpi1. In the first example embodiment, the master parameter vpm1 to be used by the terminal apparatus 1 and the collation apparatus 3 is common. In other words, the parameter vp1 generated in step S42 is a parameter corresponding to the transformation parameter vp.

In step S43, the parameter generation unit 330 generates a parameter vp2 from the master parameter vpm1 and the sub-parameter vpi2. The parameter vp2 corresponds to a parameter (permutation key K') for generating the encrypted data T" by encrypting the feature data x using the parameter vp2 (see FIG. 8). The parameter vp2 is an example of an update transformation parameter in the present example embodiment.

In step S44, the parameter generation unit 330 generates the encryption transformation parameter vp' by synthesizing the parameter vp1 and the parameter vp2. Specifically, the parameter generation unit 330 synthesizes a parameter, which is obtained by performing inverse-transformation on the parameter vp1, and the parameter vp2 to generate the encryption transformation parameter vp'.

Return to the sequence diagram in FIG. 12 to continue the explanation. In step S33, the updated information generation unit 340 acquires the encrypted data T from the DB 4. The encrypted data T corresponds to the encrypted data associated with the version information indicating the sub-parameter vpi1 received in step S41 (see FIG. 10).

In step S34, the updated information generation unit 340 transforms the encrypted data T using the encryption transformation parameter vp' to generate the updated encrypted data T3.

In step S35, the updated information generation unit 340 transmits the updated encrypted data T3 to the DB 4. In step S36, the DB 4 may overwrite the encrypted data T with the updated encrypted data T3, or may store the encrypted data T and the updated encrypted data T3 in association with the identification information of the terminal apparatus 1.

2.8.2. Example 2

Next, another example of a flow of processing for performing collation in the collation system 1000A will be described. As Example 2, a flow of processing when the collation apparatus 3 transforms the encrypted data T into the updated encrypted data T3 will be described. In other words, a flow of processing when the terminal apparatus 1 encrypts the feature data x using the transformation parameter vp and encrypts the feature data y using the transformation parameter vpx will be described.

The encrypted data T" corresponds to respective examples of second encrypted input information and fourth encrypted input information for performing collation by the collation apparatus 3 in Example 2. The feature data x corresponds to respective examples of first input information and third input information in Example 2, and the feature data y corresponds to respective examples of second input information and fourth input information in Example 2.

Figure 14:
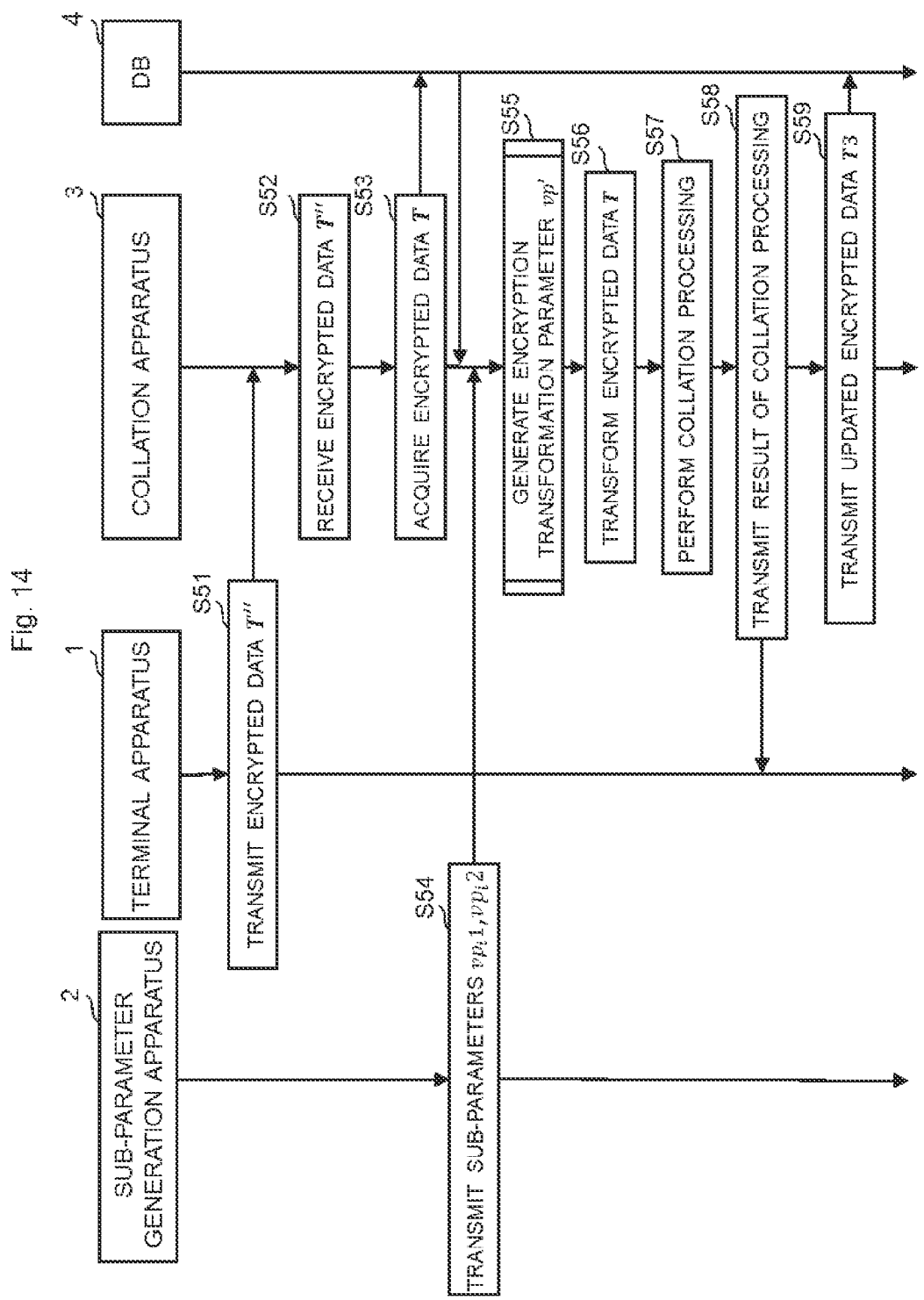
FIG. 14 is a sequence diagram illustrating a flow of processing of collating encrypted information according to Example 2 of the first example embodiment.

With reference to FIG. 14, a flow of processing for performing collation between the encrypted data T and encrypted data T" in Example 2 will be described. FIG. 14 is a sequence diagram illustrating a flow of processing for performing collation between the encrypted data T and the encrypted data T" in the collation system 1000A. As described above, the encrypted data T" corresponds to data obtained by encrypting the feature data y using the transformation parameter vpx generated from the sub-parameter vpi2. It is assumed that the identification information identifying the user of the terminal apparatus 1 from the feature data x has been extracted and the identification information identifying the user of the terminal apparatus 1 from which the feature data y has been extracted are the same.

In step S51, the network I/F 101 transmits to the collation apparatus 3 the encrypted data T" and the identification information identifying the user of the terminal apparatus 1 from which the feature data y has been extracted. In step S52, the network I/F 301 receives the encrypted data T" and the identification information which are transmitted by the terminal apparatus 1, the identification information identifying the user of the terminal apparatus 1 from which the feature data y has been extracted.

In step S53, the collation processing unit 350 acquires the encrypted data T from the DB 4. The encrypted data T is information corresponding to the identification information identifying the user of the terminal apparatus 1 that is received together with the encrypted data T" in step S52.

Next, in step S54, the sub-parameter generation apparatus 2 transmits the sub-parameters vpi1 and vpi2 to the collation apparatus 3.

In step S55, the collation apparatus 3 generates the encryption transformation parameter vp' based on the sub-parameters vpi1 and vpi2, and the master parameter vpm1. The process of step S55 is the same as that of step S32, and therefore, the overlapping descriptions are omitted.

In step S56, the updated information generation unit 340 transforms the encrypted data T using the encryption transformation parameter vp' to generate the updated encrypted data T3.

In step S57, the collation processing unit 350 performs collation between the encrypted data T" received in step S52 and the updated encrypted data T3 generated in step S56.

As explained in FIG. 8, the sort order of elements in the updated encrypted data T3 is the same as that of elements in the encrypted data T", and the updated encrypted data T3 is data corresponding to the encrypted data T". In this case, in step S58, the collation processing unit 350 transmits to the terminal apparatus 1 a collation result that the encrypted data T and the encrypted data T" are close to each other.

The terminal apparatus 1 may authenticate the user of the terminal apparatus 1 based on the result of the collation processing received from the collation apparatus 3.

In step S59, the updated information generation unit 340 transmits the updated encrypted data T3 to the DB 4. The process of step S59 may be performed when the encrypted data T' and the updated encrypted data T3 are close to each other. The DB 4 may overwrite the encrypted data T with the updated encrypted data T3, or may store the encrypted data T and the updated encrypted data T3 in association with the identification information of the user of the terminal apparatus 1.

In Example 2, the order of the collation processing in step S57 and the processing for transforming the encrypted data T in step S56 may be transposed. In other words, the collation apparatus 3 may determine whether to execute the processing for transforming the encrypted data T, based on the result of the collation processing between the encrypted data T and the encrypted data T".

In the case in which the order of the collation processing in step S57 and the processing for transforming the encrypted data T in step S56 is transposed, the transformation parameter vp used to generate the encrypted data T is different from the transformation parameter vpx used to generate the encrypted data T". Therefore, the encrypted data T" is not close to the encrypted data T. In the collation processing in step S57, if the identification information identifying the user of the terminal apparatus 1 from which the feature data x has been extracted is the same as the identification information identifying the user of the terminal apparatus 1 from which the feature data y has been extracted, and if the encrypted data T" is not close to the encrypted data T, the updated information generation unit 340 may perform the process in step S56.

2.8.3. Summary of First Example Embodiment

As explained above, in the present example embodiment, the terminal apparatus 1 uses the sub-parameter vpi1 and the master parameter vpm1 to generate the transformation parameter vp for encrypting input information. Since the master parameter vpm1 is stored in the protected area 102 in the terminal apparatus 1, there is less risk of the master parameter vpm1 being leaked compared to transmitting and receiving the permutation key over a network. In Example 1, the collation apparatus 3 can perform the collation processing even without information on the sub-parameter vpi1 and master parameter vpm1 used by the terminal apparatus 1. Therefore, the risk of information leakage is reduced, and the degradation of collation accuracy can be suppressed.

Furthermore, in Example 2, the transformation parameter vpx is generated using the sub-parameter vpi2 instead of the sub-parameter vpi1. This allows to invalidate the encrypted data T transformed by the transformation parameter vp1, thereby further increasing security.

Furthermore, in Example 2, the collation apparatus 3 transforms the encrypted data T by using the encryption transformation parameter vp'. This allows the collation apparatus 3 to transform the encrypted data T into the updated encrypted data T3, without decrypting the encrypted data T to the feature data x. The updated encrypted data T3 is a data set corresponding to the encrypted data T" obtained by encrypting the feature data x with the transformation parameter vpx. Therefore, the accuracy of the collation processing can be maintained. In this way, the present example embodiment enables the encryption processing capable of suppressing the degradation of collation accuracy and reducing the risk of information leakage.

3. Example Alternations of First Example Embodiment 3.1. Example Alternation 1

Figure 15:
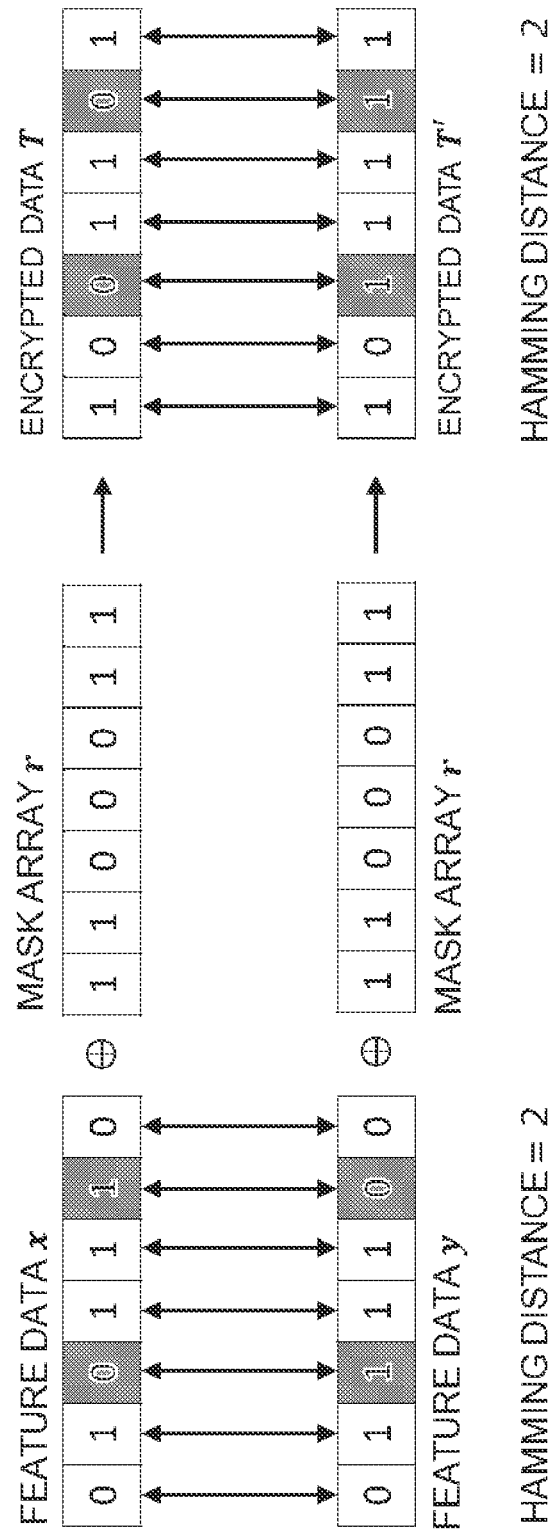
FIG. 15 is an explanation diagram for cancellable transformation with a Hamming distance mask according to an example alternation 1 of the first example embodiment.

Next, an example alternation 1 of the first example embodiment will be described with reference to FIG. 15. FIG. 15 is an explanation diagram for explaining the cancellable transformation with a Hamming distance mask as the first example alternation of the first example embodiment.

For the cancelable transformation in the collation system 1000A, in place of the method of permutating the elements in the feature data x (see FIGS. 5 and 8), the feature data x may be encrypted by a method called Hamming distance mask, for example. In the cancelable transformation with the Hamming distance mask, the transformation processing unit 150 calculates a logical exclusive OR of each dimensional element in feature data below $$x=(0,1,0,1,1,1,0) \quad \text{[Math. 15]}$$

and each dimensional element in a mask array below, which is a data set including a random sequence of bits.

[Math. 16]

$$r=(1,1,0,0,0,1,1) \quad \text{(Expression 4-1)}$$

Through the above calculation of the logical exclusive OR, the encrypted data T is generated (see the upper row on the right side in FIG. 15).

In the cancelable transformation with the Hamming distance mask, the mask array r including a random bit sequence for masking each dimensional element in the feature data x is an example of the transformation parameter vp in the present example alternation. The encrypted data T' is generated by calculating the logical exclusive OR of the mask array r, which includes a random bit sequence, and each dimensional element in the feature data y.

Since a Hamming distance of the feature data y to the feature data x matches a Hamming distance between the encrypted data T and the encrypted data T', the accuracy of the collation processing can be maintained in the cancelable transformation in the present example alternation.

When transforming the encrypted data T into the updated encrypted data T3 in the collation apparatus 3, the mask array r', which is a data set including a random bit sequence having an array different from (Expression 4-1), may be used as the encryption transformation parameter vp'. This allows to transform the encrypted data T into the updated encrypted data T3, without decrypting the encrypted data T to the feature data x. This configuration is based on the assumption that the terminal apparatus 1 calculates a logical exclusive OR of the mask array r' with respect to the feature data y to generate the encrypted data T''.

3.2. Example Alternation 2

Figure 16:
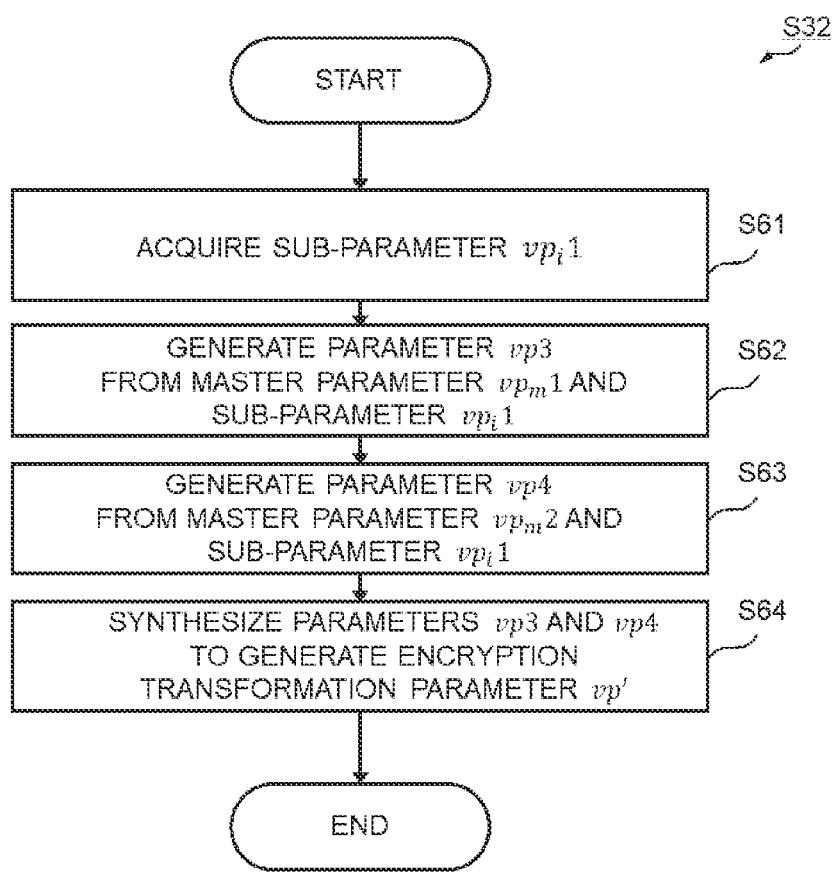
FIG. 16 is a flowchart illustrating a flow of processing of generating the encryption transformation parameter according to an example alternation 2 of the first example embodiment.

Next, an example alternation 2 of the first example embodiment will be described with reference to FIG. 16. FIG. 16 is a flowchart illustrating a flow of processing for generating the encryption transformation parameter vp' according to the second example alternation of the first example embodiment.

As an example aspect of generating the encryption transformation parameter vp' in the collation system 1000A, an example of using the sub-parameters vpi1 and vpi2, and the master parameter vpm1 is described in the first example embodiment.

For the present example alternation, with reference to FIG. 16, in a configuration in which the collation apparatus 3 is connected to the terminal apparatus 1 and other information processing apparatuses each having elements corresponding to the terminal apparatus 1, an example will be described in which a plurality of master parameters (e.g., master parameters vpm1 and vpm2) stored in the storage area 320 are used to generate the encryption transformation parameter vp'. It is assumed that the master parameter vpm2 is stored in respective protected areas of the other information processing apparatuses each having elements corresponding to the terminal apparatus 1.

The flowchart in FIG. 16 corresponds to the process performed in step S32 of FIG. 12. In the flowchart of FIG. 16, the explanation is based on the assumption that the collation apparatus 3 receives the sub-parameter vpi1 from the sub-parameter generation apparatus 2 in the process of step S31.

In step S61, the sub-parameter acquisition unit 310 acquires the sub-parameter vpi1 from the sub-parameter generation apparatus 2 via the network I/F 301.

In step S62, the parameter generation unit 330 generates a parameter vp3 from the master parameter vpm1 and the sub-parameter vpi1. The master parameter vpm1 is stored in the terminal apparatus 1. In other words, the parameter vp3 generated in step S62 is a parameter corresponding to the transformation parameter vp.

In step S63, the parameter generation unit 330 generates a parameter vp4 from the master parameter vpm2 and the sub-parameter vpi1. The master parameter vpm2 is stored in the other information processing apparatus having elements corresponding to the terminal apparatus 1. In other words, the parameter vp4 generated in step S63 corresponds to a transformation parameter for encrypting feature data in the other information processing apparatus having elements corresponding to the terminal apparatus 1. The master parameter vpm2 is an example of a fourth parameter in the present example embodiment. The parameter vp4 is an example of an update transformation parameter in the present example embodiment.

In step S64, the parameter generation unit 330 synthesizes the parameter vp3 and the parameter vp4 to generate the encryption transformation parameter vp'. Specifically, the parameter generation unit 330 synthesizes a parameter, which is obtained by performing inverse-transformation on the parameter vp3, and the parameter vp4 to generate the encryption transformation parameter vp'. The processes performed after step S64 is the same as in the first example embodiment.

In a configuration in which Example 1 of the first example embodiment is applied to the present example alternation, the DB 4 may store therein information for identifying the master parameter used to generate the encrypted data, as version information (see FIG. 10).

As described above, even if biometric information of the same person is encrypted in the terminal apparatus 1 and the other information processing apparatus having elements corresponding to the terminal apparatus 1, the collation apparatus 3 in the present example alternation uses the master parameters vpm1 and vpm2, and the sub-parameter vpi1 to generate the encryption transformation parameter vp'. The present example alternation also enables the encryption processing capable of suppressing the degradation of collation accuracy and reducing the risk of information leakage, as in the first example embodiment. Furthermore, in the present example alternation, for biometric information encrypted by the terminal apparatus 1, the collation processing can be performed by inputting biometric information to the other information processing apparatus having elements corresponding to the terminal apparatus 1.

3.3. Example Alternation 3

Figure 17:
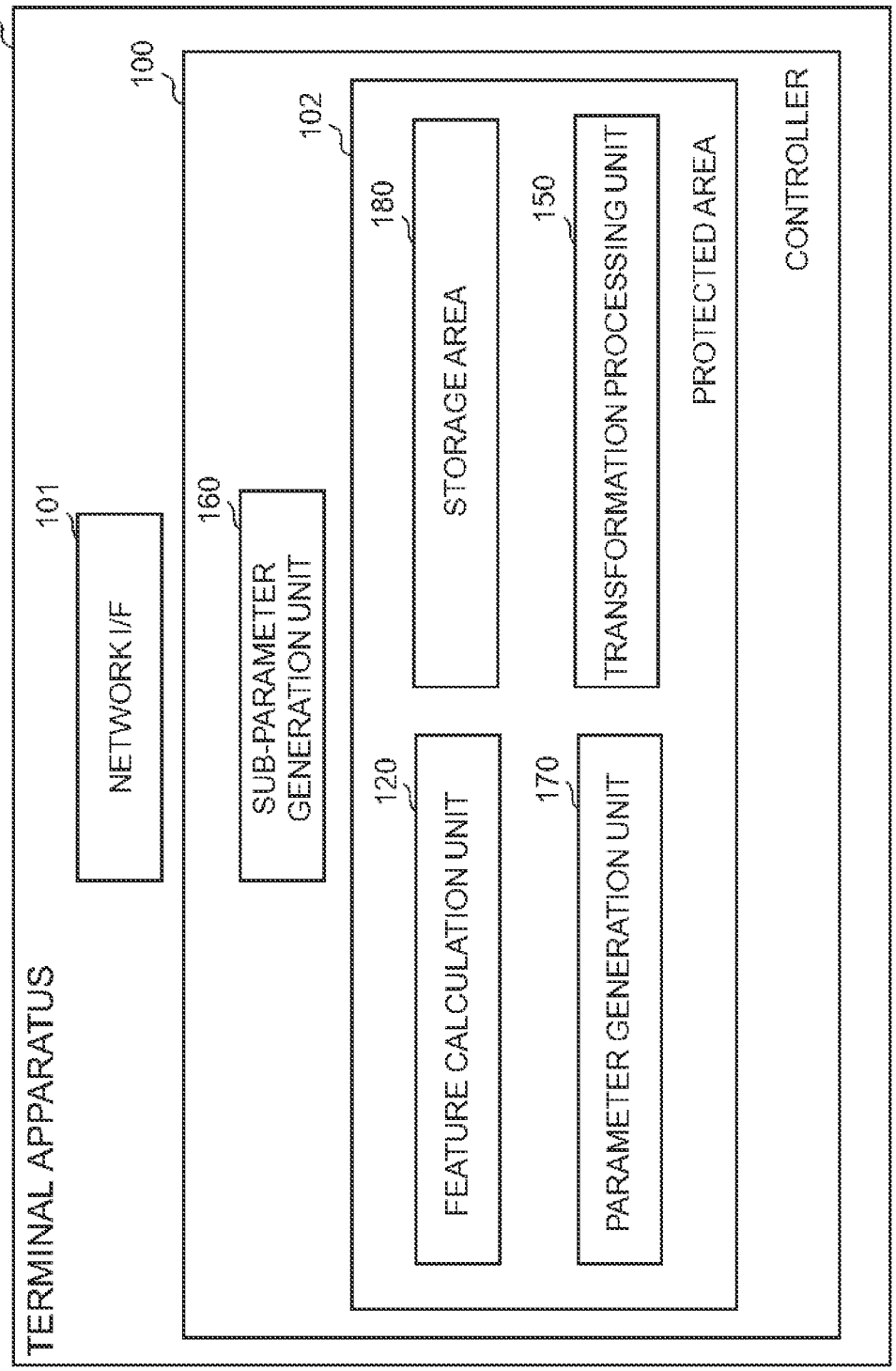
FIG. 17 is a functional block diagram illustrating a functional configuration of a terminal apparatus according to an example alternation 3 of the first example embodiment.

Next, a configuration of the terminal apparatus 1 according to an example alternation 3 of the first example embodiment will be described with reference to FIG. 17. FIG. 17 is a functional block diagram illustrating a functional configuration of the terminal apparatus 1 according to the example alternation 3 of the first example embodiment. The terminal apparatus 1 according to the example alternation 3 includes an element corresponding to the sub-parameter generation unit 210, an element corresponding to the sub-parameter storage unit 230, and an element corresponding to the parameter generation unit 330 in the first example embodiment. In FIG. 17, the same elements as those of the terminal apparatus 1 shown in FIG. 4 are denoted by the same reference signs, and overlapping descriptions are omitted.

The controller 100 of the terminal apparatus 1 according to the present example alternation includes a feature calculation unit 120, a transformation processing unit 150, a sub-parameter generation unit 160, a parameter generation unit 170, and a storage area 180.

The sub-parameter generation unit 160 is an element corresponding to the sub-parameter generation unit 210 in the first example embodiment. In other words, the sub-parameter generation unit 160 generates the sub-parameter vpi1 for generating the transformation parameter vp. For example, the sub-parameter generation unit 160 generates a sub-random number seed for generating a random number as the sub-parameter vpi1. The sub-parameter generation unit 160 can also generate the sub-parameter vpi2 different from the sub-parameter vpi1.

The parameter generation unit 170 has both an element corresponding to the parameter generation unit 140 and an element corresponding to the parameter generation unit 330 in the first example embodiment. In other words, the parameter generation unit 170 generates the transformation parameter vp for encrypting information input to the terminal apparatus 1, based on the master parameter vpm1 and sub-parameter vpi1 stored in the storage area 180. In addition, the parameter generation unit 170 generates the encryption transformation parameter vp' using the master parameter vpm1, the sub-parameter vpi1, and a sub-parameter different from the sub-parameter vpi1 (e.g., sub-parameter vpi2) which are stored in the storage area 180. The transformation processing unit 150 uses the encryption transformation parameter vp' to transform the encrypted data T, which is obtained by encrypting the feature data x using the transformation parameter vp, to thereby generate the updated encrypted data T3.

The storage area 180 has both an element corresponding to the storage area 130 and an element corresponding to the sub-parameter storage unit 230 in the first example embodiment. In other words, the storage area 180 stores therein the master parameter vpm1 used to generate the transformation parameter vp or the encryption transformation parameter vp', and the sub-parameters such as the sub-parameters vpi1 and vpi2 generated by the sub-parameter generation unit 160. The storage area 180 may store identification information identifying the terminal apparatus 1 or identification information identifying a user who has input biometric information to the terminal apparatus 1, in association with the sub-parameters vpi1 and vpi2, etc.

In the present example alternation, even if the master parameter vpm1, and the sub-parameters vpi1 and vpi2 are not implemented in the collation apparatus 3, the terminal apparatus 1 can perform the processing for generating the encrypted data T'', and the processing for transforming the encrypted data T into the updated encrypted data T3. Therefore, the present example alternation also enables the encryption processing capable of suppressing the degradation of collation accuracy and reducing the risk of information leakage, as in the first example embodiment.

4. Second Example Embodiment

Figure 18:
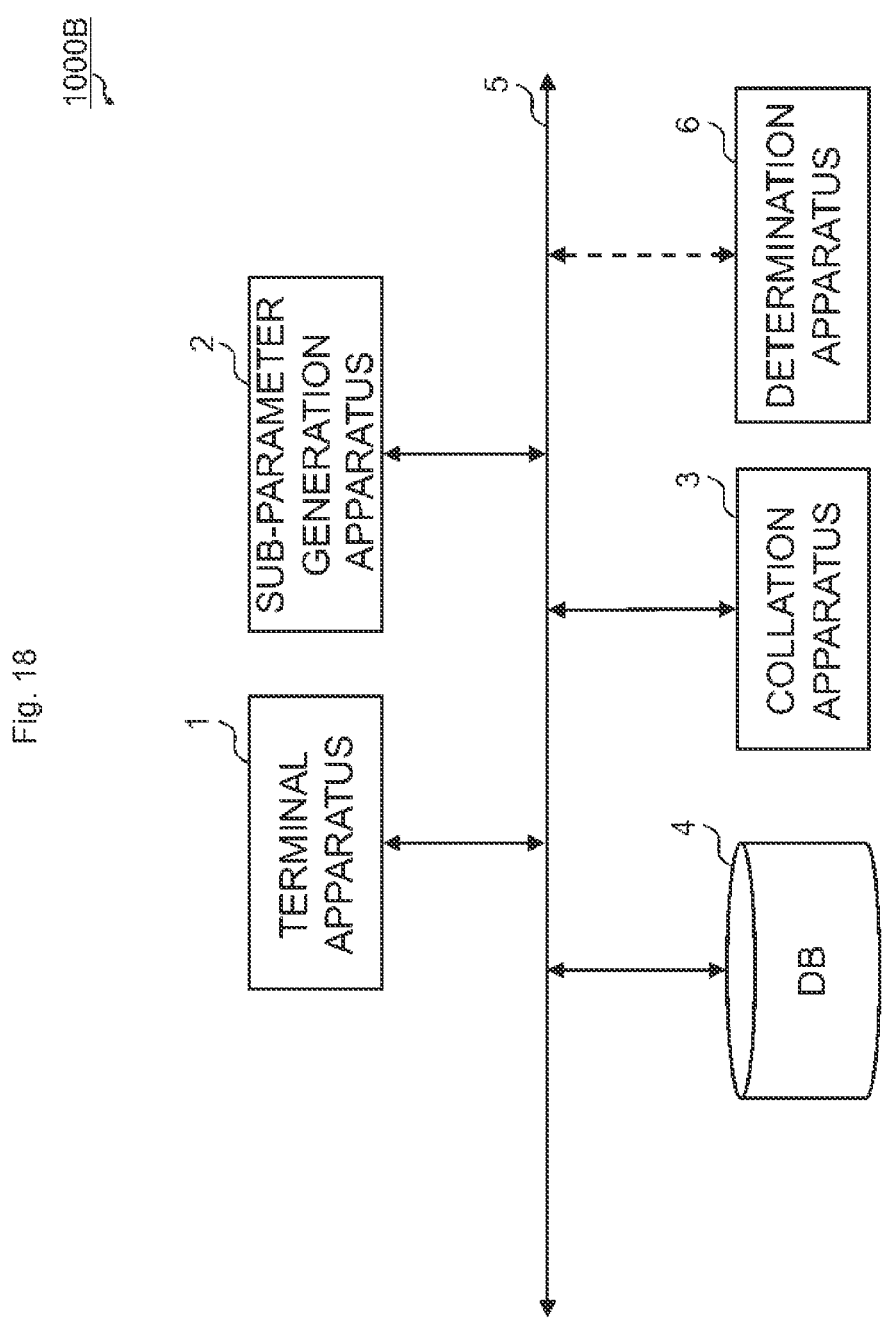
FIG. 18 is a diagram illustrating an example operation embodiment of a collation system according to a second example embodiment.

Next, a second example embodiment of the present invention will be described with reference to FIGS. 18 to 21. FIG. 18 is a diagram illustrating an example operation embodiment of a collation system 1000B in the present example embodiment. In the collation system 1000B of FIG. 18, the same elements as those of the collation system 1000A shown in FIG. 1 are denoted by the same reference signs, and overlapping descriptions are omitted.

As illustrated in FIG. 18, the collation system 1000B differs from the collation system 1000A in that it includes a determination apparatus 6.

Figure 19:
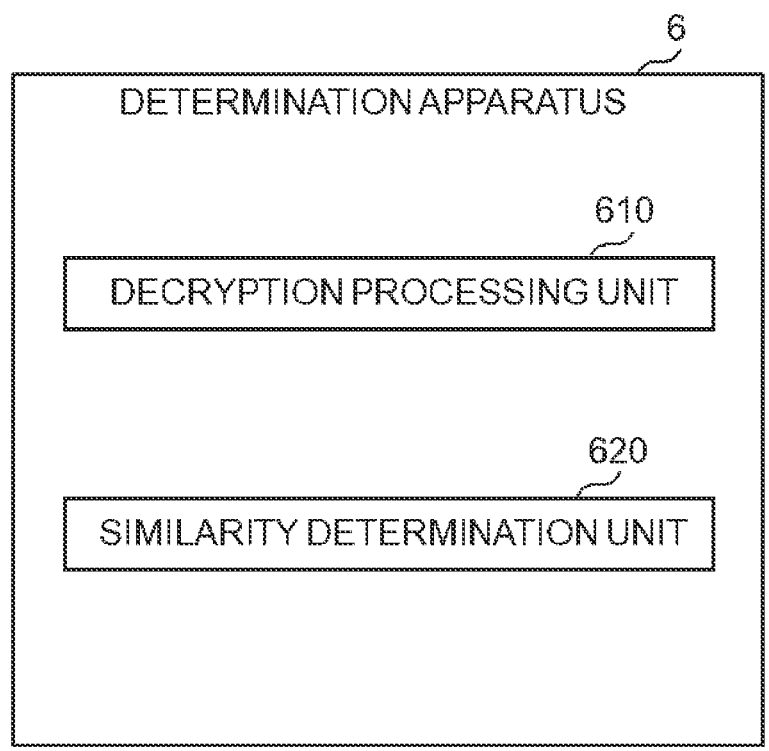
FIG. 19 is a functional block diagram illustrating a functional configuration of a determination apparatus according to the second example embodiment.

FIG. 19 is a functional block diagram illustrating a functional configuration of the determination apparatus 6. The functional configuration of the determination apparatus 6 is implemented with the same hardware configuration including the elements illustrated in FIG. 2, and the CPU 11 of the determination apparatus 6 performs calculations in accordance with a program stored in the ROM 12 of determination apparatus 6, or a program loaded into the RAM 13 of the determination apparatus 6 from the storage medium 14 of the determination apparatus 6, thereby to implement software control units of the determination apparatus 6.

The combination of the software control units configured above and the hardware allows to implement functional blocks that can realize functions of the determination apparatus 6 according to the present example embodiment.

The determination apparatus 6 includes a decryption processing unit 610, and a similarity determination unit 620. The decryption processing unit 610 decrypts the result of the collation processing received from the collation apparatus 3 using a ciphertext decryption parameter sk''. The similarity determination unit 620 determines a similarity between feature data R and feature data S, based on the result of the collation processing decrypted by the decryption processing unit 610.

Figure 20:
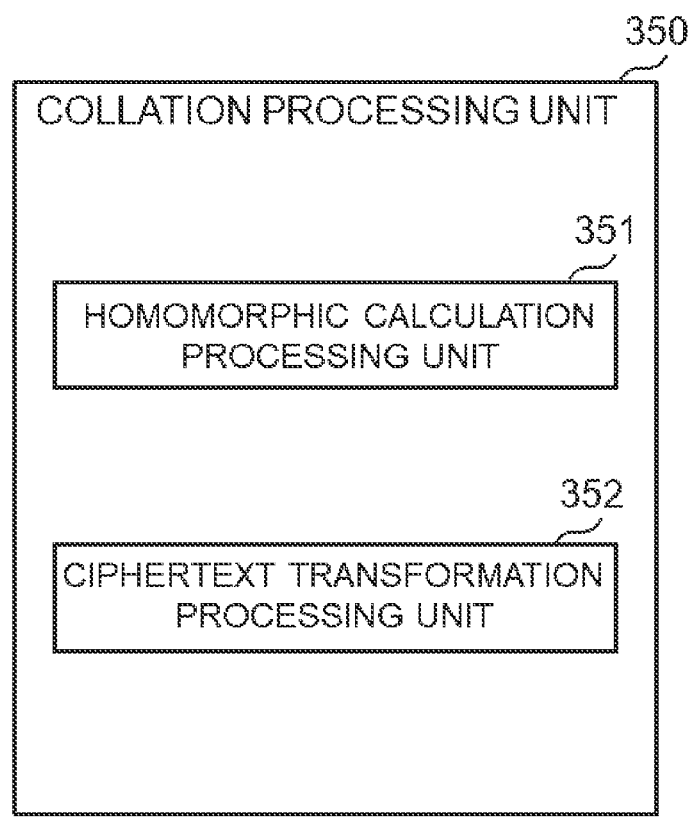
FIG. 20 is a functional block diagram illustrating an internal configuration of a collation processing unit according to the second example embodiment.

Next, referring to FIG. 20, an internal configuration of the collation processing unit 350 according to the present example embodiment will be described. FIG. 20 is a functional block diagram illustrating an internal configuration of the collation processing unit 350.

As illustrated in FIG. 20, the collation processing unit 350 includes a homomorphic calculation processing unit 351, and a ciphertext transformation processing unit 352. The homomorphic calculation processing unit 351 performs so-called homomorphic calculations, which include adding, subtracting, and multiplying encrypted information in its encrypted state. The ciphertext transformation processing unit 352 encrypts calculation results of the homomorphic calculation processing unit 351 with a ciphertext transformation parameter sk'.

Figure 21:
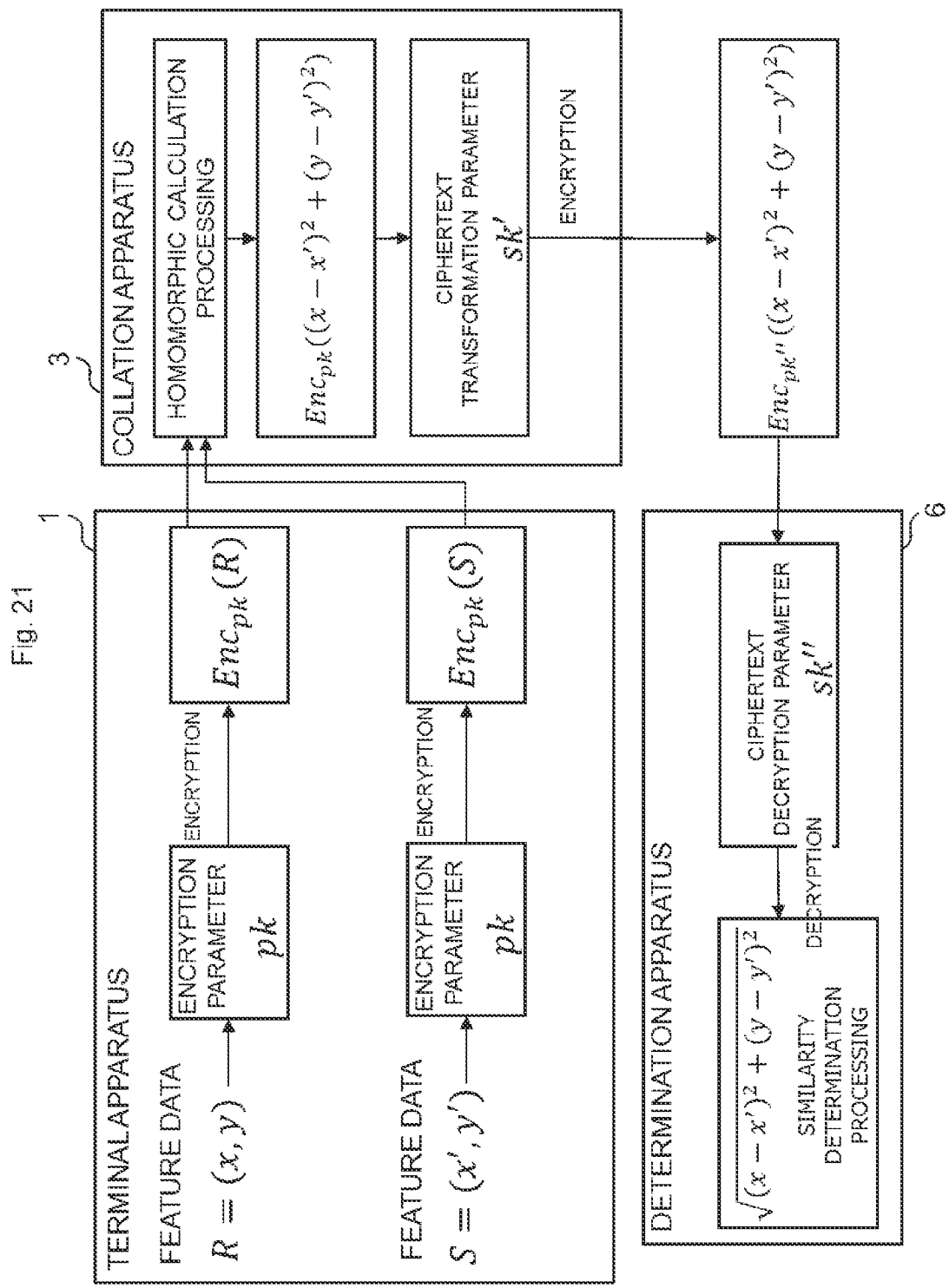
FIG. 21 is a model diagram illustrating an overview of collation processing using homomorphic calculation in the collation system according to the second example embodiment.

Next, with reference to FIG. 21, an overview of the collation processing in the collation system 1000B will be described. FIG. 21 is a model diagram illustrating an overview of the collation processing using the homomorphic calculation processing in the collation system 1000B.

The terminal apparatus 1 encrypts the feature data R=(x, y) and the feature data S=(x', y') by using an encryption parameter pk. It is assumed that the feature data R=(x, y) and the feature data S=(x', y') are facial images acquired from the same person, respectively. The encryption parameter pk is an example of a transformation parameter in the present example embodiment.

The parameter generation unit 140 generates the encryption parameter pk using the sub-parameter vpi1 received from the sub-parameter generation apparatus 2, and the master parameter vpm1. Encpk(R) is data obtained by encrypting the feature data R=(x, y) with the encryption parameter pk. Encpk(S) is data obtained by encrypting the feature data S=(x', y') with the encryption parameter pk. Encpk(R) is transmitted from the terminal apparatus 1 to the DB 4. Encpk(S) is transmitted from the terminal apparatus 1 to the collation apparatus 3.

The collation apparatus 3 acquires Encpk(R) stored in the DB 4. Then, the homomorphic calculation processing unit 351 performs the homomorphic calculation on Encpk(R) and Encpk(S) to calculate a similarity between Encpk(R) and Encpk(S) as follows.

[Math. 17]

$$Enc_{pk}\big((x-x')^2 + (y-y')^2\big)$$

The ciphertext transformation processing unit 352 encrypts the similarity between Encpk(R) and Encpk(S) with the ciphertext transformation parameter sk', and transmits to the determination apparatus 6 a ciphertext shown in (Expression 5-1).

[Math. 18]

$$Enc_{pk''}\big((x-x')^2 + (y-y')^2\big) \qquad \text{(Expression 5-1)}$$

The ciphertext transformation processing unit 352 is an example of an encrypted similarity information generation unit in the present example embodiment. The ciphertext shown in (Expression 5-1) corresponds to encrypted similarity information obtained by encrypting information indicating the similarity between Encpk (R) and Encpk (S). The ciphertext transformation parameter sk' is a parameter that depends on the encryption parameter pk.

The decryption processing unit 610 decrypts the information indicating the similarity between Encpk(R) and Encpk (S) in (Expression 5-1), which is received from the collation apparatus 3, with the ciphertext decryption parameter sk''. With the ciphertext decryption parameter sk'', the information indicating the similarity between Encpk(R) and Encpk (S) in (Expression 5-1) is decrypted to obtain a plaintext below, which can be calculated by the determination apparatus 6.

[Math. 19]

$$\sqrt{(x-x')^2 + (y-y')^2} \qquad \text{(Expression 5-2)}$$

The ciphertext decryption parameter sk'' is a parameter that depends on the encryption parameter pk.

The similarity determination unit 620 determines a similarity between the feature data R=(x, y) and the feature data S=(x', y') based on (Expression 5-2). The collation system 1000B may authenticate the user of the terminal apparatus 1 based on a determination result of the similarity determination unit 620.

When encrypting the feature data S=(x', y'), the terminal apparatus 1 may generate the encryption parameter pk' using the sub-parameter vpi2 and the master parameter vpm1. In such a case, the parameter generation unit 330 receives the sub-parameter vpi2 and the master parameter vpm1 from the sub-parameter generation apparatus 2, and generates the encryption transformation parameter vp' using the sub-parameter vpi2, and the master parameter vpm1.

Then, the homomorphic calculation processing is performed on Encpk(R), which has been transformed using the encryption transformation parameter vp', and on Encpk'(S), which has been obtained by encrypting the feature data S=(x', y') using the encryption parameter pk'. This allows to perform collation between the feature data R=(x, y) and the feature data S=(x', y').

As described above, even in the case of collating Encpk (R) and Encpk(S) by the homomorphic calculation processing, the present example embodiment can invalidate Encpk (R) without decrypting Encpk(R) into the feature data R=(x, y), as in the first example embodiment.

5. Third Example Embodiment

Next, a third example embodiment of the present invention will be described with reference to FIGS. 22 to 24. The above-described first and second example embodiments are concrete example embodiments, whereas the third example embodiment is a more generalized example embodiment.

Figure 22:
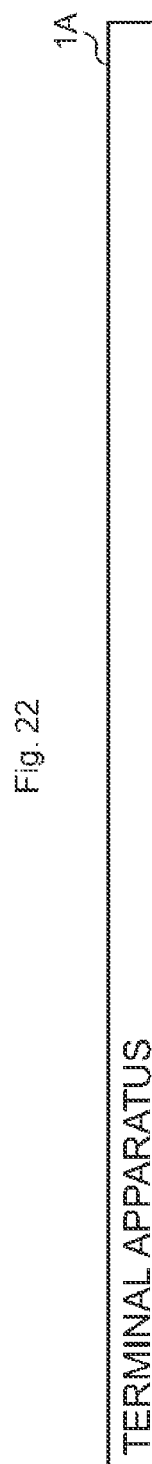
FIG. 22 is a block diagram illustrating an example of a schematic configuration of a terminal apparatus according to a third example embodiment.

FIG. 22 is a block diagram illustrating an example of a schematic configuration of a terminal apparatus 1A according to the third example embodiment. The terminal apparatus 1A includes a terminal-side acquisition unit 110A, a terminal-side storage area 130A, a transformation parameter generation unit 140A, and an encrypted information generation unit 150A.

The terminal-side acquisition unit 110A acquires a second parameter. The terminal-side storage area 130A stores a first parameter therein. The transformation parameter generation unit 140A performs transformation parameter generation processing for generating a transformation parameter based on the first parameter and the second parameter. The encrypted information generation unit 150A encrypts input information using the transformation parameter to generate encrypted input information.

Figure 23:
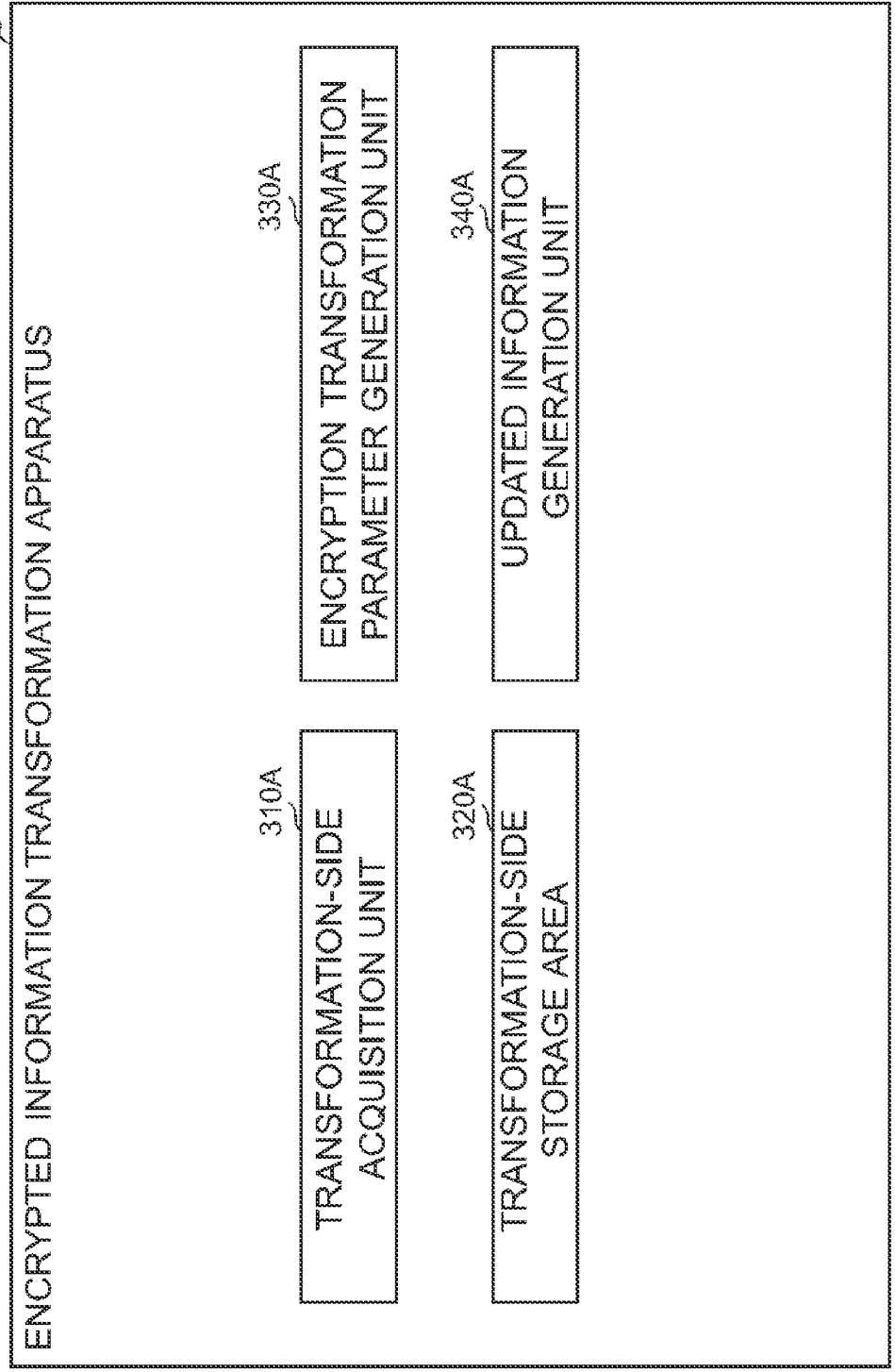
FIG. 23 is a block diagram illustrating an example of a schematic configuration of an encrypted information transformation apparatus according to the third example embodiment.

FIG. 23 is a block diagram illustrating an example of a schematic configuration of an encrypted information transformation apparatus 3A according to the third example embodiment. The encrypted information transformation apparatus 3A includes a transformation-side acquisition unit 310A, a transformation-side storage area 320A, an encryption transformation parameter generation unit 330A, and an updated information generation unit 340A.

The transformation-side acquisition unit 310A acquires the second parameter used to generate the encrypted input information, and a third parameter that is different from the second parameter. The transformation-side storage area 320A stores the first parameter therein. The encryption transformation parameter generation unit 330A uses the first parameter, the second parameter, and the third parameter to generate an encryption transformation parameter for transforming the encrypted input information.

The updated information generation unit 340A transforms the encrypted input information using the encryption transformation parameter to generate updated encrypted input information.

The transformation-side acquisition unit 310A, the transformation-side storage area 320A, the encryption transformation parameter generation unit 330A that stores a plurality of master parameters including the first parameter, and the updated information generation unit 340A may be configured as follows. For example, the transformation-side acquisition unit 310A acquires the second parameter used to generate the encrypted input information. The transformation-side storage area 320A stores the plurality of master parameters including the first parameter therein. The encryption transformation parameter generation unit 330A uses the plurality of master parameters and the second parameter to generate the encryption transformation parameter for transforming the encrypted input information. The updated information generation unit 340A transforms the encrypted input information using the encryption transformation parameter to generate the updated encrypted input information.

A collation processing unit 350A performs collation processing for performing collation between first input information, which is input to the terminal apparatus 1A for collation, and second input information, which is different from the first input information input to the terminal apparatus 1A for collation, based on first encrypted information and second encrypted information. The encrypted information generation unit 150A encrypts the first input information using a transformation parameter to generate the first encrypted information. The second encrypted information is generated by encrypting the second input information.

The collation processing unit 350A may be configured as follows. For example, the collation processing unit 350A performs collation processing for performing collation between third input information, which is input to the terminal apparatus 1A for collation, and fourth input information, which is input to the terminal apparatus 1A for collation and is different from the third input information, based on third encrypted information and fourth encrypted information. The encrypted information generation unit 150A encrypts the third input information using a transformation parameter to generate the third encrypted information. The fourth encrypted information is generated by encrypting the fourth input information.

FIG. 24 is a block diagram illustrating an example of a schematic configuration of a collation system 1000C according to the third example embodiment of the present invention. As illustrated in FIG. 24, the collation system 1000C includes the terminal apparatus 1A, and the collation processing unit 350A.

Relationship with First and Second Example Embodiments

In one example, the terminal apparatus 1A according to the third example embodiment may perform the operations of the terminal apparatus 1 according to the first or second example embodiment. Similarly, in one example, the encrypted information transformation apparatus 3A according to the third example embodiment may perform the operations of the collation apparatus 3 according to the first or second example embodiment. Similarly, in one example, the collation system 1000C according to the third example embodiment may perform the operations of the collation system 1000A according to the first embodiment or perform the operations of the collation system 1000B according to the second example embodiment. In the above configuration, the description of the first or second example embodiment can be applied to the third example embodiment. The third example embodiment is not limited to the above examples.

6. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

The processing steps illustrated in the flowchart are not necessarily performed in the order illustrated in the flowchart or the sequence diagram. The processing steps may be performed in an order different from that illustrated in the flowchart or the sequence diagram, or two or more processing steps may be performed in parallel. Some of the processing steps may be deleted, or further processing steps may be added.

An apparatus (e.g., one or more apparatuses (or units) out of plurality of apparatuses (or units) constituting the terminal apparatus, or a module for one of the plurality of apparatuses (or units)) including constituent elements (e.g., the terminal-side storage area, the terminal-side acquisition unit, the transformation parameter generation unit and/or the encrypted information generation unit) of the terminal apparatus described in the Specification may be provided. An apparatus (e.g., one or more apparatuses (or units) out of plurality of apparatuses (or units) constituting the encrypted information transformation apparatus, or a module for one of the plurality of apparatuses (or units)) including constituent elements (e.g., the transformation-side storage area, the transformation-side acquisition unit, the encryption transformation parameter generation unit and/or the updated information generation unit) of the encrypted information transformation apparatus described in the Specification may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as in the following supplementary notes, but are not limited to the following.

(Supplementary Note 1)

A terminal apparatus for encrypting input information to be input for collation, the terminal apparatus comprising:
  a terminal-side storage area configured to store a first parameter;
  a terminal-side acquisition unit configured to acquire a second parameter;
  a transformation parameter generation unit configured to perform transformation parameter generation processing for generating a transformation parameter based on the first parameter and the second parameter; and
  an encrypted information generation unit configured to encrypt the input information using the transformation parameter to generate encrypted input information.

(Supplementary Note 2)

The terminal apparatus according to Supplementary Note 1, wherein
  the first parameter is a first random number seed,
  the second parameter is a second random number seed,
  the transformation parameter generation unit is configured to generate a random number using the first random number seed and the second random number seed in the transformation parameter generation processing, and the encrypted information generation unit is configured to encrypt the input information using the random number as the transformation parameter.

(Supplementary Note 3)

The terminal apparatus according to Supplementary Note 1, wherein the second parameter is an encrypted parameter obtained by encrypting the transformation parameter, the first parameter is a secret key for decrypting the encrypted parameter, and the transformation parameter generation unit is configured to decrypt the encrypted parameter using the secret key to generate the transformation parameter in the transformation parameter generation processing.

(Supplementary Note 4)

The terminal apparatus according to any one of Supplementary Notes 1 to 3, wherein the terminal-side storage area, the transformation parameter generation unit and the encrypted information generation unit are implemented in a protected area in the terminal apparatus.

(Supplementary Note 5)

The terminal apparatus according to any one of Supplementary Notes 1 to 4, wherein the transformation parameter is a permutation key for permutating a sort order of elements in information to be encrypted in the encrypted information generation unit, and the encrypted information generation unit is configured to permutate a sort order of elements in the input information using the permutation key to generate the encrypted input information.

(Supplementary Note 6)

The terminal apparatus according to any one of Supplementary Notes 1 to 4, wherein the transformation parameter is a data set including a random bit sequence corresponding to elements in information to be encrypted in the encrypted information generation unit, and the encrypted information generation unit is configured to calculate a logical exclusive OR of the input information and the data set to generate the encrypted input information.

(Supplementary Note 7)

An encrypted information transformation apparatus for transforming encrypted input information into updated encrypted input information, the encrypted input information being generated by encrypting input information to be input for collation using a transformation parameter, the transformation parameter being generated based on a first parameter and a second parameter, the encrypted information transformation apparatus comprising:

a transformation-side storage area configured to store the first parameter;

a transformation-side acquisition unit configured to acquire the second parameter used for generating the encrypted input information, and a third parameter that is different from the second parameter;

an encryption transformation parameter generation unit configured to, using the first parameter, the second parameter and the third parameter, generate an encryption transformation parameter for transforming the encrypted input information; and an updated information generation unit configured to transform the encrypted input information using the encryption transformation parameter to generate the updated encrypted input information.

(Supplementary Note 8)

The encrypted information transformation apparatus according to Supplementary Note 7, wherein the encryption transformation parameter generation unit is configured to generate the transformation parameter using the first parameter and the second parameter, generate an update transformation parameter that is different from the transformation parameter, using the first parameter and the third parameter, and synthesize the transformation parameter and the update transformation parameter to generate the encryption transformation parameter.

(Supplementary Note 9)

The encrypted information transformation apparatus according to Supplementary Note 7 or 8, wherein the transformation parameter is a first permutation key for permutating a sort order of elements in the input information, the encryption transformation parameter is a second permutation key for permutating a sort order of elements in the encrypted input information, and the updated information generation unit is configured to permutate the sort order of the elements in the encrypted input information using the second permutation key to generate the updated encrypted input information.

(Supplementary Note 10)

The encrypted information transformation apparatus according to Supplementary Note 7 or 8, wherein the transformation parameter is a first data set including a random bit sequence corresponding to elements in the input information, the encryption transformation parameter is a random bit sequence corresponding to elements in the encrypted input information, and is a second data set that is different from the first data set, and the updated information generation unit is configured to calculate a logical exclusive OR of the encrypted input information and the second data set to generate the updated encrypted input information.

(Supplementary Note 11)

The encrypted information transformation apparatus according to any one of Supplementary Notes 7 to 10, wherein the transformation-side storage area, the encryption transformation parameter generation unit and the updated information generation unit are implemented in a protected area in the encrypted information transformation apparatus.

(Supplementary Note 12)

An encrypted information transformation apparatus for transforming encrypted input information into updated encrypted input information, the encrypted input information being generated by encrypting input information to be input for collation using a transformation parameter, the transformation parameter being generated using a first parameter and a second parameter, the encrypted information transformation apparatus comprising:

a transformation-side storage area configured to store a plurality of master parameters including the first parameter;

a transformation-side acquisition unit configured to acquire the second parameter used for generating the encrypted input information;

an encryption transformation parameter generation unit configured to, using the plurality of master parameters and the second parameter, generate an encryption transformation parameter for transforming the encrypted input information; and an updated information generation unit configured to transform the encrypted input information using the encryption transformation parameter to generate the updated encrypted input information.

(Supplementary Note 13)

The encrypted information transformation apparatus according to Supplementary Note 12, wherein the encryption transformation parameter generation unit is configured to generate the transformation parameter using the first parameter and the second parameter, generate an update transformation parameter that is different from the transformation parameter, using the second parameter, and the master parameter other than the first parameter, and synthesize the transformation parameter and the update transformation parameter to generate the encryption transformation parameter.

(Supplementary Note 14)

The encrypted information transformation apparatus according to Supplementary Note 12 or 13, wherein the transformation parameter is a first permutation key for permutating a sort order of elements in the input information, the encryption transformation parameter is a second permutation key for permutating a sort order of elements in the encrypted input information, and the updated information generation unit is configured to permutate the sort order of the elements in the encrypted input information using the second permutation key to generate the updated encrypted input information.

(Supplementary Note 15)

The encrypted information transformation apparatus according to Supplementary Note 12 or 13, wherein the transformation parameter is a first data set including a random bit sequence corresponding to elements in the input information, the encryption transformation parameter is a random bit sequence corresponding to elements in the encrypted input information, and is a second data set that is different from the first data set, and the updated information generation unit is configured to calculate a logical exclusive OR of the encrypted input information and the second data set to generate the updated encrypted input information.

(Supplementary Note 16)

The encrypted information transformation apparatus according to any one of Supplementary Notes 12 to 15, wherein the transformation-side storage area, the encryption transformation parameter generation unit and the updated information generation unit are implemented in a protected area in the encrypted information transformation apparatus.

(Supplementary Note 17)

A collation system comprising:

the terminal apparatus according to any one of Supplementary Notes 1 to 6; and a collation processing unit configured to perform collation processing for performing collation between first input information, which is input to the terminal apparatus for collation, and second input information, which is different from the first input information input to the terminal apparatus for collation, based on first encrypted input information and second encrypted input information, the first encrypted input information being generated by encrypting the first input information using the transformation parameter by the encrypted information generation unit, and the second encrypted input information being generated by encrypting the second input information.

(Supplementary Note 18)

The collation system according to Supplementary Note 17, further comprising the encrypted information transformation apparatus according to any one of Supplementary Notes 7 to 11.

(Supplementary Note 19)

The collation system according to Supplementary Note 18, wherein the encrypted information transformation apparatus includes the collation processing unit.

(Supplementary Note 20)

The collation system according to Supplementary Note 19, wherein the collation processing unit is implemented in a protected area included in the encrypted information transformation apparatus.

(Supplementary Note 21)

The collation system according to any one of Supplementary Notes 18 to 20, further comprising a parameter transmission apparatus configured to transmit the second parameter and the third parameter to the terminal apparatus and the encrypted information transformation apparatus.

(Supplementary Note 22)

The collation system according to Supplementary Note 21, wherein the parameter transmission apparatus includes a parameter generation unit configured to generate the second parameter and the third parameter.

(Supplementary Note 23)

The collation system according to Supplementary Note 21 or 22, wherein the transformation parameter generation unit is configured to generate a terminal-side update transformation parameter that is different from the transformation parameter, based on the first parameter and the third parameter, and the encrypted information generation unit is configured to encrypt the second input information using the terminal-side update transformation parameter to generate the second encrypted input information.

(Supplementary Note 24)

The collation system according to Supplementary Note 23, wherein the encryption transformation parameter generation unit is configured to generate the encryption transformation parameter using the first parameter, the second parameter and the third parameter, the updated information generation unit is configured to transform the first encrypted input information into the updated encrypted input information with the encryption transformation parameter generated using the first parameter, the second parameter and the third parameter, and the collation processing unit is configured to perform the collation processing based on the updated encrypted input information generated by transforming the first encrypted input information, and the second encrypted input information generated using the terminal-side update transformation parameter.

(Supplementary Note 25)

The collation system according to any one of Supplementary Notes 17 to 24, wherein
the collation processing unit includes
a homomorphic calculation processing unit configured to perform homomorphic calculation on the first encrypted input information and the second encrypted input information to output a similarity between the first input information and the second input information in encrypted form, and
an encrypted similarity information generation unit configured to encrypt the similarity output in encrypted form to generate encrypted similarity information, and
the collation system includes
a decryption processing unit configured to decrypt the encrypted similarity information, and
a similarity determination unit configured to determine a similarity of the second input information with respect to the first input information, based on the decrypted similarity information.

(Supplementary Note 26)

A collation system comprising:
the terminal apparatus according to any one of Supplementary Notes 1 to 6; and
a collation processing unit configured to perform collation processing for performing collation between third input information, which is input to the terminal apparatus for collation, and fourth input information, which is different from the third input information input to the terminal apparatus for collation, based on third encrypted input information and fourth encrypted input information, the third encrypted input information being generated by encrypting the third input information using the transformation parameter by the encrypted information generation unit, and the fourth encrypted input information being generated by encrypting the fourth input information.

(Supplementary Note 27)

The collation system according to Supplementary Note 26, further comprising the encrypted information transformation apparatus according to any one of Supplementary Notes 7 to 11.

(Supplementary Note 28)

The collation system according to Supplementary Note 27, wherein the encrypted information transformation apparatus includes the collation processing unit.

(Supplementary Note 29)

The collation system according to Supplementary Note 28, wherein the collation processing unit is implemented in a protected area included in the encrypted information transformation apparatus.

(Supplementary Note 30)

The collation system according to any one of Supplementary Notes 27 to 29, further comprising a parameter transmission apparatus configured to transmit the second parameter to the terminal apparatus and the encrypted information transformation apparatus.

(Supplementary Note 31)

The collation system according to Supplementary Note 30, wherein the parameter transmission apparatus includes a parameter generation unit configured to generate the second parameter.

(Supplementary Note 32)

The collation system according to Supplementary Note 30 or 31, wherein
the terminal apparatus is configured to store in the terminal-side storage area a fourth parameter that is different from the first parameter and the second parameters,
the transformation parameter generation unit is configured to generate a terminal-side update transformation parameter that is different from the transformation parameter, based on the second parameter and the fourth parameter, and
the encrypted information generation unit is configured to encrypt the fourth input information using the terminal-side update transformation parameter to generate the fourth encrypted input information.

(Supplementary Note 33)

The collation system according to Supplementary Note 32, wherein
the encrypted information transformation apparatus is configured to store the fourth parameter as the master parameter,
the encryption transformation parameter generation unit is configured to generate the encryption transformation parameter using the first parameter, the second parameter and the fourth parameter,
the updated information generation unit is configured to transform the third encrypted input information using the encryption transformation parameter generated based on the fourth parameter, and
the collation processing unit is configured to perform the collation processing based on the updated encrypted input information generated by transforming the third encrypted input information by the updated information generation unit, and the fourth encrypted input information generated using the terminal-side update transformation parameter in the terminal apparatus.

(Supplementary Note 34)

The collation system according to any one of Supplementary Notes 26 to 33, wherein
the collation processing unit includes
a homomorphic calculation processing unit configured to perform homomorphic calculation on the third encrypted input information and the fourth encrypted input information to output a similarity between the third input information and the fourth input information in encrypted form, and
an encrypted similarity information generation unit configured to encrypt the similarity output in encrypted form to generate encrypted similarity information, and
the collation system includes
a decryption processing unit configured to decrypt the encrypted similarity information, and
a similarity determination unit configured to determine a similarity of the fourth input information with respect to the third input information, based on the decrypted similarity information.

(Supplementary Note 35)

The collation system according to any one of Supplementary Notes 17 to 34, wherein the collation processing unit is configured to transmit a result of the collation processing to the terminal apparatus.

(Supplementary Note 36)

An input information encryption method comprising:
performing transformation parameter generation processing for generating a transformation parameter based on a first parameter stored in a storage area, and a second parameter that is different from the first parameter; and encrypting, using the transformation parameter, input information to be input for collation to generate encrypted input information.

(Supplementary Note 37)

An encrypted information transformation method for transforming encrypted input information into updated encrypted input information, the encrypted input information being generated by encrypting input information to be input for collation using a transformation parameter, the transformation parameter being generated using a first parameter and a second parameter, the encrypted information transformation method comprising:
  acquiring the second parameter used for generating the encrypted input information;
  acquiring a third parameter that is different from the second parameter;
  generating an encryption transformation parameter for transforming the encrypted input information, using the first parameter stored in a storage area and the acquired second and third parameters; and
  transforming the encrypted input information using the encryption transformation parameter to generate the updated encrypted input information.

(Supplementary Note 38)

An encrypted information transformation method for transforming encrypted input information into updated encrypted input information, the encrypted input information being generated by encrypting input information to be input for collation using a transformation parameter, the transformation parameter being generated using a first parameter and a second parameter, the encrypted information transformation method comprising:
  acquiring the second parameter used for generating the encrypted input information;
  generating an encryption transformation parameter for transforming the encrypted input information, using the second parameter, and a master parameter other than the first parameter stored in a storage area; and
  transforming the encrypted input information using the encryption transformation parameter to generate the updated encrypted input information.

(Supplementary Note 39)

A collation method comprising:
  performing transformation parameter generation processing for generating a transformation parameter based on a first parameter stored in a storage area in a terminal apparatus, and a second parameter that is different from the first parameter;
  encrypting input information to be input for collation using the transformation parameter to generate encrypted input information; and
  performing collation processing for performing collation between first input information for collation, and second input information, which is different from the first input information input for collation, based on first encrypted input information and second encrypted input information, the first encrypted input information being generated by encrypting the first input information using the transformation parameter, and the second encrypted input information being generated by encrypting the second input information.

(Supplementary Note 40)

A collation method comprising:
  performing transformation parameter generation processing for generating a transformation parameter based on a first parameter stored in a storage area in a terminal apparatus, and a second parameter that is different from the first parameter;
  encrypting input information to be input for collation using the transformation parameter to generate encrypted input information; and
  performing collation processing for performing collation between third input information, which is input for collation, and fourth input information, which is different from the third input information input for collation, based on third encrypted input information and fourth encrypted input information, the third encrypted input information being generated by encrypting the third input information using the transformation parameter, and the fourth encrypted input information being generated by encrypting the fourth input information.

(Supplementary Note 41)

An input information encryption program causing a processor to execute:
  performing transformation parameter generation processing for generating a transformation parameter based on a first parameter stored in a storage area, and a second parameter that is different from the first parameter; and
  encrypting, using the transformation parameter, input information to be input for collation to generate encrypted input information.

(Supplementary Note 42)

An encrypted information transformation program for transforming encrypted input information into updated encrypted input information, the encrypted input information being generated by encrypting input information to be input for collation using a transformation parameter, the transformation parameter being generated using a first parameter and a second parameter, the encrypted information transformation program causing a processor to execute:
  acquiring the second parameter used for generating the encrypted input information;
  acquiring a third parameter that is different from the second parameter;
  generating an encryption transformation parameter for transforming the encrypted input information, using the first parameter stored in a storage area and the acquired second and third parameters; and transforming the encrypted input information using the encryption transformation parameter to generate the updated encrypted input information.

(Supplementary Note 43)

An encrypted information transformation program for transforming encrypted input information into updated encrypted input information, the encrypted input information being generated by encrypting input information to be input for collation using a transformation parameter, the transformation parameter being generated using a first parameter and a second parameter, the encrypted information transformation program causing a processor to execute:
  acquiring the second parameter used for generating the encrypted input information;
  generating an encryption transformation parameter for transforming the encrypted input information, using the second parameter, and a master parameter other than the first parameter stored in a storage area; and
  transforming the encrypted input information using the encryption transformation parameter to generate the updated encrypted input information.

INDUSTRIAL APPLICABILITY

There are provided a terminal apparatus, an encrypted information transformation apparatus, a collation system, an input information encryption method, an encrypted information transformation method, a collation method, an input information encryption program, and an encrypted information transformation program that perform encryption processing capable of suppressing the degradation of collation accuracy and reducing the risk of information leakage.

REFERENCE SIGNS LIST 1, 1A Terminal Apparatus
2 Sub-parameter Generation Apparatus
3 Collation Apparatus
3A Encrypted Information Transformation Apparatus
4 DB
5 Network
6 Determination Apparatus
102 Protected Area
110 Sub-parameter Acquisition Unit
110A Terminal-side Acquisition Unit
120 Feature Calculation Unit
130 Storage Area
130A Terminal-side Storage Area
140 Parameter Generation Unit
140A Transformation Parameter Generation Unit
150 Transformation Processing Unit
150A Encrypted Information Generation Unit
160 Sub-parameter Generation Unit
170 Parameter Generation Unit
180 Storage Area
210 Sub-parameter Generation Unit
220 Sub-parameter Transmission Unit
230 Sub-parameter Storage Unit
302 Protected Area
310 Sub-parameter Acquisition Unit
310A Transformation-side Acquisition Unit
320 Storage Area
320A Transformation-side Storage Area
330 Parameter Generation Unit
330A Encryption Transformation Parameter Generation Unit
340, 340A Updated Information Generation Unit
350, 350A Collation Processing Unit
351 Homomorphic Calculation Processing Unit
352 Ciphertext Transformation Processing Unit
610 Decryption Processing Unit
620 Similarity Determination Unit
1000A, 1000B, 1000C Collation System

What is claimed is:

1. An encrypted information transformation apparatus for transforming encrypted input information into updated encrypted input information, the encrypted input information being generated by encrypting input information to be input for collation using a transformation parameter, the transformation parameter being generated based on a first parameter and a second parameter, the encrypted information transformation apparatus comprising:
one or more memories storing instructions and including a transformation-side storage area configured to store the first parameter; and
one or more processors configured to execute the instructions to
acquire the second parameter used for generating the encrypted input information, and a third parameter that is different from the second parameter;
generate, using the first parameter, the second parameter and the third parameter, an encryption transformation parameter for transforming the encrypted input information; and
transform the encrypted input information using the encryption transformation parameter to generate the updated encrypted input information.

2. The encrypted information transformation apparatus according to claim 1, wherein the one or more processors are configured to execute the instructions to
generate the transformation parameter using the first parameter and the second parameter,
generate an update transformation parameter that is different from the transformation parameter, using the first parameter and the third parameter, and
synthesize the transformation parameter and the update transformation parameter to generate the encryption transformation parameter.

3. The encrypted information transformation apparatus according to claim 1, wherein
the transformation parameter is a first permutation key for permutating a sort order of elements in the input information,
the encryption transformation parameter is a second permutation key for permutating a sort order of elements in the encrypted input information, and
the one or more processors are configured to execute the instructions to permutate the sort order of the elements in the encrypted input information using the second permutation key to generate the updated encrypted input information.

4. The encrypted information transformation apparatus according to claim 1, wherein
the transformation parameter is a first data set including a random bit sequence corresponding to elements in the input information,
the encryption transformation parameter is a random bit sequence corresponding to elements in the encrypted input information, and is a second data set that is different from the first data set, and
the one or more processors are configured to execute the instructions to calculate a logical exclusive OR of the encrypted input information and the second data set to generate the updated encrypted input information.

5. The encrypted information transformation apparatus according to claim 1, wherein the transformation-side storage area, and the instructions are implemented in a protected area in the encrypted information transformation apparatus.

6. An encrypted information transformation apparatus for transforming encrypted input information into updated encrypted input information, the encrypted input information being generated by encrypting input information to be input for collation using a transformation parameter, the transformation parameter being generated using a first parameter and a second parameter, the encrypted information transformation apparatus comprising:
one or more memories storing instructions and including a transformation-side storage area configured to store a plurality of master parameters including the first parameter; and
one or more processors configured to execute the instructions to
acquire the second parameter used for generating the encrypted input information;

generate, using the plurality of master parameters and the second parameter, generate an encryption transformation parameter for transforming the encrypted input information; and transform the encrypted input information using the encryption transformation parameter to generate the updated encrypted input information.

7. The encrypted information transformation apparatus according to claim 6, wherein the one or more processors are configured to execute the instructions to generate the transformation parameter using the first parameter and the second parameter, generate an update transformation parameter that is different from the transformation parameter, using the second parameter, and the master parameter other than the first parameter, and synthesize the transformation parameter and the update transformation parameter to generate the encryption transformation parameter.

8. The encrypted information transformation apparatus according to claim 6, wherein the transformation parameter is a first permutation key for permutating a sort order of elements in the input information, the encryption transformation parameter is a second permutation key for permutating a sort order of elements in the encrypted input information, and the one or more processors are configured to execute the instructions to permutate the sort order of the elements in the encrypted input information using the second permutation key to generate the updated encrypted input information.

9. The encrypted information transformation apparatus according to claim 6, wherein the transformation parameter is a first data set including a random bit sequence corresponding to elements in the input information, the encryption transformation parameter is a random bit sequence corresponding to elements in the encrypted input information, and is a second data set that is different from the first data set, and the one or more processors are configured to execute the instructions to calculate a logical exclusive OR of the encrypted input information and the second data set to generate the updated encrypted input information.

10. The encrypted information transformation apparatus according to claim 6, wherein the transformation-side storage area, and the instructions are implemented in a protected area in the encrypted information transformation apparatus.

* * * * *